(12) United States Patent
Okada

(10) Patent No.: US 12,054,248 B2
(45) Date of Patent: Aug. 6, 2024

(54) PROPELLER, FLYING OBJECT, AND METHOD FOR MANUFACTURING PROPELLER

(71) Applicant: Sony Group Corporation, Tokyo (JP)

(72) Inventor: Mitsushi Okada, Tokyo (JP)

(73) Assignee: Sony Group Corporation, Tokyo (JP)

(*) Notice: Subject to any disclaimer, the term of this patent is extended or adjusted under 35 U.S.C. 154(b) by 27 days.

(21) Appl. No.: 18/013,293

(22) PCT Filed: Jun. 16, 2021

(86) PCT No.: PCT/JP2021/022859
§ 371 (c)(1),
(2) Date: Dec. 28, 2022

(87) PCT Pub. No.: WO2022/004387
PCT Pub. Date: Jan. 6, 2022

(65) Prior Publication Data
US 2023/0257113 A1 Aug. 17, 2023

(30) Foreign Application Priority Data
Jun. 30, 2020 (JP) .................. 2020-113428

(51) Int. Cl.
*B64C 27/46* (2006.01)
*B64F 5/10* (2017.01)
*B64U 10/10* (2023.01)

(52) U.S. Cl.
CPC ............... *B64C 27/46* (2013.01); *B64F 5/10* (2017.01); *B64U 10/10* (2023.01)

(58) Field of Classification Search
CPC ......... B64C 11/16; B64C 11/18; B64C 11/28; B64C 27/46; B64C 27/467; F05D 2240/20; F05D 2240/301
See application file for complete search history.

(56) References Cited

U.S. PATENT DOCUMENTS

| 4,460,531 A | * | 7/1984 | Harris | ............... B29C 70/48 |
| | | | | 156/173 |
| 8,128,376 B2 | * | 3/2012 | Karem | ............... B64C 27/467 |
| | | | | 416/228 |
| 10,415,581 B1 | * | 9/2019 | Seeley | ............... F04D 29/384 |

FOREIGN PATENT DOCUMENTS

| CN | 105584625 A | | 5/2016 | |
| CN | 111498108 B | * | 7/2021 | ............. B64C 11/18 |

(Continued)

OTHER PUBLICATIONS

International Search Report from corresponding PCT application PCT/JP2021/022859, dated Jul. 20, 2021.

*Primary Examiner* — Courtney D Heinle
*Assistant Examiner* — Danielle M. Christensen
(74) *Attorney, Agent, or Firm* — K&L Gates LLP

(57) ABSTRACT

A propeller includes a plurality of blades that extends outward in a radial direction of a rotation central axis relative to the rotation central axis, and includes an end that is located on an opposite side of the rotation central axis. Each of the plurality of blades has a maximum angle of elevation in a position ranging from 30% to 60% with the rotation central axis as a starting point of a radius of a circle that passes through the end of each of the plurality of blades with the rotation central axis as a center, the maximum angle of elevation being a maximum of an angle of elevation in each of the plurality of blades. A change in the angle of elevation in a longitudinal direction of each of the plurality of blades is within 10 degrees per 5% of the radius. A change in the longitudinal direction of a cross-sectional maximum blade thickness is within 20% of a maximum blade thickness of each of the plurality of blades per 5% of the radius, the cross-sectional maximum blade thickness being a maximum blade thickness in a cross section of each of the plurality of blades, the cross section being orthogonal to the longitudinal (Continued)

direction. A change in a chord length of each of the plurality of blades in the longitudinal direction is within 20% of a maximum of the chord length in each of the plurality of blades per 5% of the radius.

14 Claims, 17 Drawing Sheets

(56) References Cited

FOREIGN PATENT DOCUMENTS

| | | |
|---|---|---|
| JP | 2018131038 A | 8/2018 |
| JP | 2019025957 A | 2/2019 |
| WO | 2017146028 A1 | 8/2017 |

* cited by examiner

PROPELLER, FLYING OBJECT, AND METHOD FOR MANUFACTURING PROPELLER

FIELD

The present disclosure relates to a propeller, a flying object, and a method for manufacturing the propeller.

BACKGROUND

Some propellers include a plurality of blades, and rotate with a rotation central axis as a center.

CITATION LIST

Patent Literature

Patent Literature 1: JP 2018-131038 A
Patent Literature 2: JP 2019-25957 A
Patent Literature 3: WO 2017/146028 A

SUMMARY

Technical Problem

In this type of propeller, stress that is applied during rotation due to centrifugal force and a bending moment is likely to be concentrated in the vicinity of a rotating axis. Therefore, it is desired that the strength of a portion in the vicinity of the rotation central axis in the propeller be improved.

Accordingly, the present disclosure proposes a propeller, a flying object, and a method for manufacturing the propeller that are capable of improving the strength of a portion in the vicinity of a rotation central axis.

Solution to Problem

A propeller according to the present disclosure includes: a plurality of blades that extends outward in a radial direction of a rotation central axis relative to the rotation central axis, and includes an end that is located on an opposite side of the rotation central axis, wherein each of the plurality of blades has a maximum angle of elevation in a position ranging from 30% to 60% with the rotation central axis as a starting point of a radius of a circle that passes through the end of each of the plurality of blades with the rotation central axis as a center, the maximum angle of elevation being a maximum of an angle of elevation in each of the plurality of blades, a change in the angle of elevation in a longitudinal direction of each of the plurality of blades is within 10 degrees per 5% of the radius, a change in the longitudinal direction of a cross-sectional maximum blade thickness is within 20% of a maximum blade thickness of each of the plurality of blades per 5% of the radius, the cross-sectional maximum blade thickness being a maximum blade thickness in a cross section of each of the plurality of blades, the cross section being orthogonal to the longitudinal direction, and a change in a chord length of each of the plurality of blades in the longitudinal direction is within 20% of a maximum of the chord length in each of the plurality of blades per 5% of the radius.

DESCRIPTION OF EMBODIMENTS

Embodiments of the present disclosure are described in detail below with reference to the drawings. Note that in each of the embodiments described below, the same portion is denoted by the same reference sign, and therefore a duplicate description is omitted.

Description is provided in the order described below.
[1. First Embodiment]
　　[1-1. Configuration of Flying Object according to First Embodiment]
　　[1-2. Propeller]
　　[1-3. Operation]
　　[1-4. Propeller in Comparative Example]
　　[1-5. Comparison between Propeller according to First Embodiment and Comparative Example]
　　[1-6. Method for Manufacturing Propeller according to First Embodiment]
　　[1-7. Effects]
[2. Second Embodiment]
　　[2-1. Configuration of Propeller Propelling System according to Second Embodiment]
　　[2-2. Effects]
　　[2-3. Variations]
[3. Third Embodiment]
　　[3-1. Configuration of Propeller Propelling System according to Third Embodiment]
　　[3-2. Effects]
　　[3-3. Variations]
[4. Fourth Embodiment]
　　[4-1. Configuration of Propeller Propelling System according to Fourth Embodiment]
　　[4-2. Effects]
　　[4-3. Variations]

1. First Embodiment

[1-1. Configuration of Flying Object According to First Embodiment]

Figure 1:
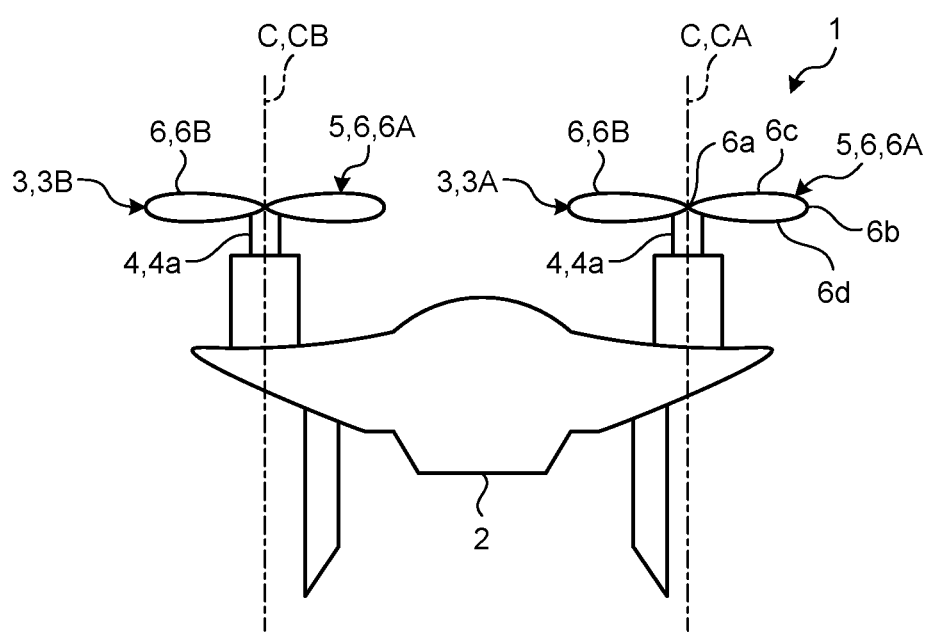
FIG. 1 is a front view of a flying object according to a first embodiment of the present disclosure.

FIG. 1 is a front view of a flying object 1 according to a first embodiment of the present disclosure.

As illustrated in FIG. 1, the flying object 1 includes a machine body 2, and a plurality (for example, four) of propeller propelling devices 3 that is supported by the machine body 2. Note that in FIG. 1, only two propeller propelling devices 3A and 3B of the four propeller propelling devices 3 are illustrated. The flying object 1 is, for example, a drone. Note that the flying object 1 may be a manned flying object. In addition, the number of propeller propelling devices 3 is not limited to the number described above.

The propeller propelling device 3 includes a motor 4 and a propeller 5. A rotor 4a of the motor 4 and the propeller 5 rotate with a rotation central axis C as a center. A position of the rotation central axis C differs in each of the propeller propelling devices 3. The rotation central axes C of the plurality of propeller propelling devices 3 are, for example, parallel to each other. In FIG. 1, from among a plurality of rotation central axes C, rotation central axes CA and CB of the propeller propelling devices 3A and 3B are illustrated. The rotor 4a of the motor 4 includes a motor shaft and an iron core. The motor 4 is an outer rotor. Note that the motor 4 may be different from the outer rotor. The motor 4 is an example of a driving source.

[1-2. Propeller]

Figure 2:
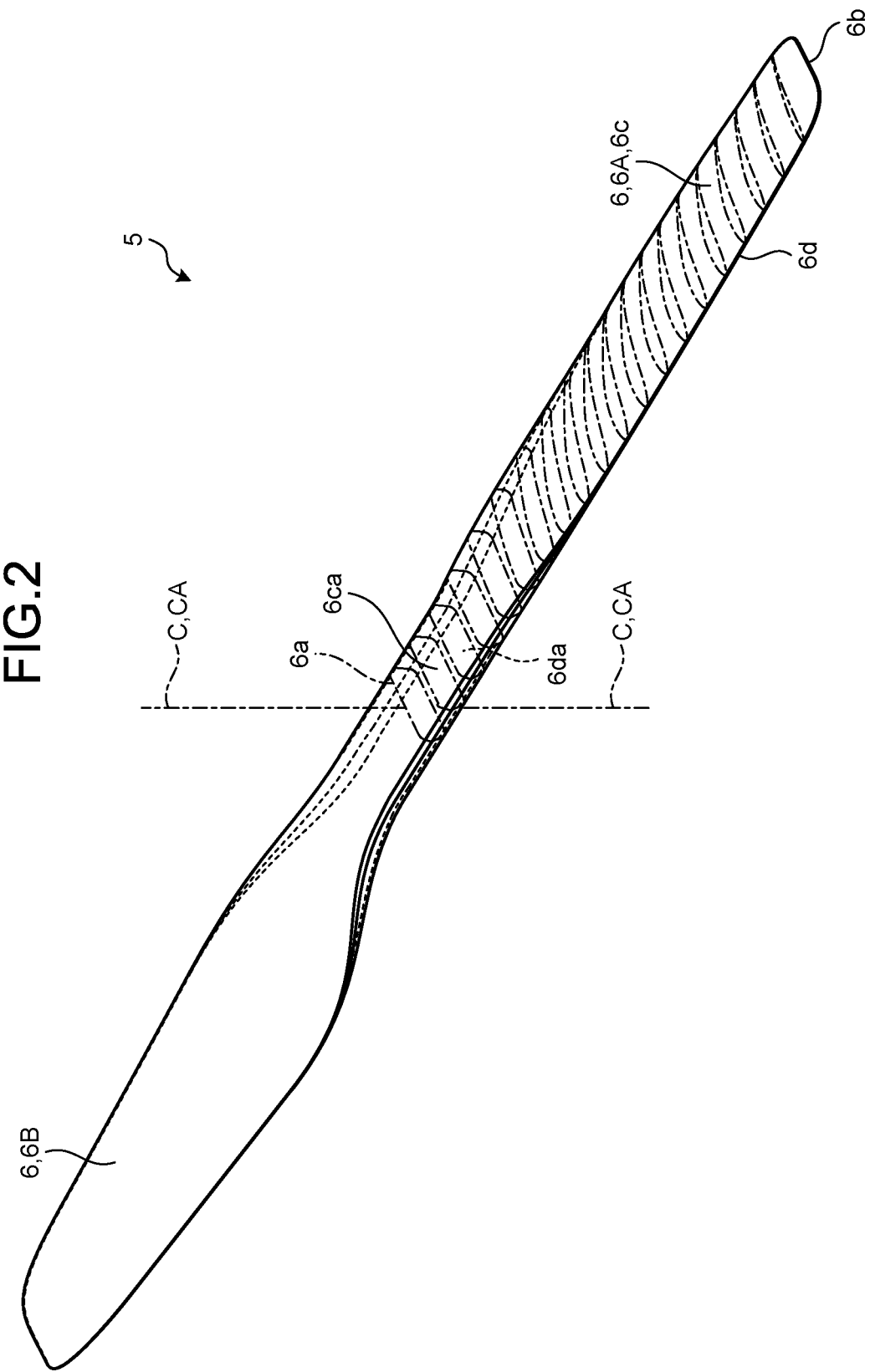
FIG. 2 is a perspective view of a propeller according to the first embodiment.
Figure 3:
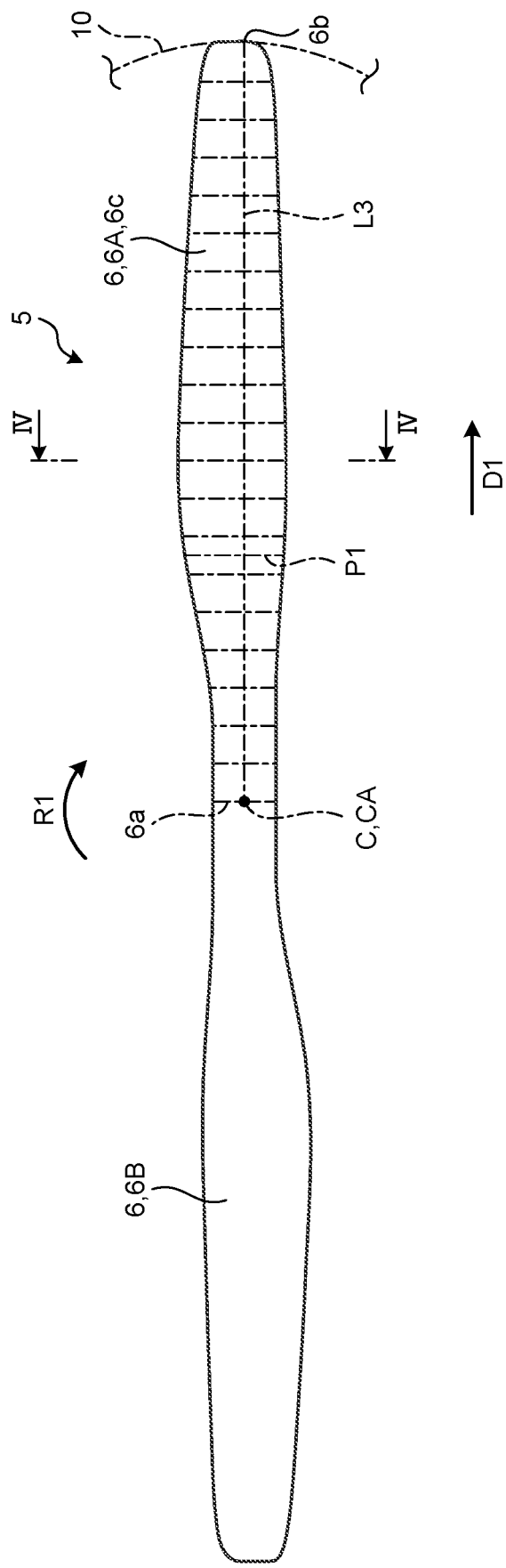
FIG. 3 is a plan view of the propeller according to the first embodiment.
Figure 4:
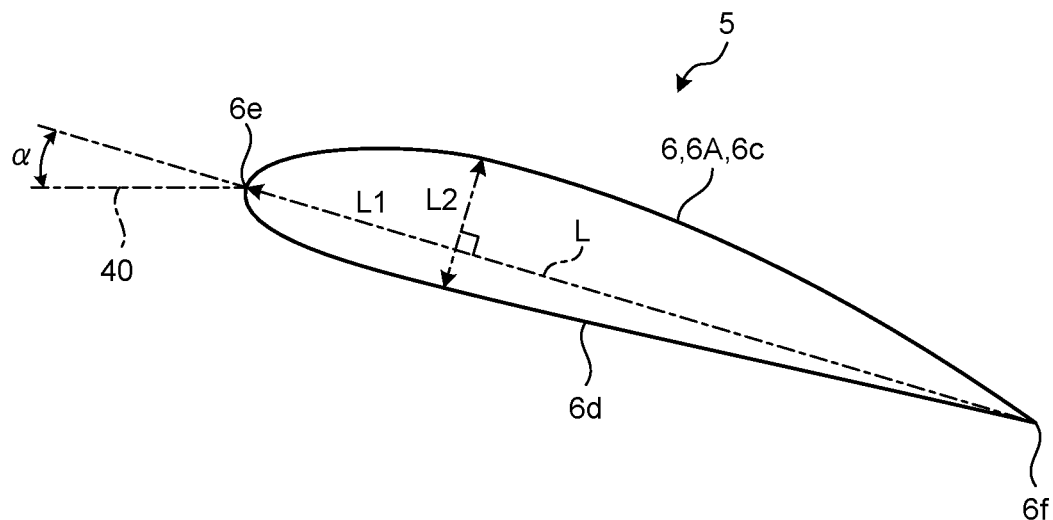
FIG. 4 is an explanatory diagram for explaining the propeller according to the first embodiment, and is a diagram illustrating a cross section along line IV-IV of FIG. 3.

FIG. 2 is a perspective view of the propeller 5 according to the first embodiment. FIG. 3 is a plan view of the propeller 5 according to the first embodiment. FIG. 4 is an explanatory diagram for explaining the propeller 5 according to the first embodiment, and is a diagram illustrating a cross section along line IV-IV of FIG. 3.

As illustrated in FIGS. 2 and 3, the propeller 5 includes a plurality (as an example, two) of blades 6A and 6B. Hereinafter, as a generic term of the plurality of blades 6A and 6B, a blade 6 is used. Two blades 6 extend outward in a radial direction of the rotation central axis C relative to the rotation central axis C. The two blades 6 extend to sides opposite to each other relative to the rotation central axis C. The two blades 6 have been formed integrally with each other, and configure a single member (individual). Note that the number of blades 6 is not limited to the number described above. The number of blades 6 may be three or four, or may be five or more.

The blade 6 includes a proximal end 6a that is located on a side of the rotation central axis C, and a distal end 6b serving as an end that is located on an opposite side of the rotation central axis C. In addition, the blade 6 includes an upper face 6c, and a lower face 6d that is located on an opposite side of the upper face 6c. The upper face 6c and the lower face 6d are located on sides opposite to each other in an axis direction of the rotation central axis C. The upper face 6c and the lower face 6d are stretched between the proximal end 6a and the distal end 6b. In the two blades 6, the proximal ends 6a, the upper faces 6c, and the lower faces 6d are connected to each other. Each of the upper face 6c and the lower face 6d is an example of a face.

A material of the blade 6 is, for example, a thermoplastic resin such as a carbon fiber-reinforced thermoplastic resin or a polyamide resin-based material. Note that the material of the blade 6 is not limited to the material described above.

In FIG. 4, a relationship among an angle of elevation α, chord length L1, and cross-sectional maximum blade thickness L2 of the blade 6 is illustrated. FIG. 4 illustrates a cross section along line IV-IV of FIG. 3, as described above. Here, line IV-IV of FIG. 3 is a line along a direction that is orthogonal to a longitudinal direction (direction D1) of the blade 6 and the axis direction of the rotation central axis C. The angle of elevation α is a rake angle of a chord L serving as a straight line that connects a front end 6e and a rear end 6f of the blade 6, relative to a rotation direction R1 (FIG. 3) of the blade 6. In other words, the angle of elevation α is a rake angle of the chord L relative to a plane 40 that is orthogonal to the rotation central axis C. The angle of elevation α is also referred to as a mounting angle. The length of the chord L is the chord length L1. The cross-sectional maximum blade thickness L2 is a maximum blade thickness in a cross section of the blade 6 that is orthogonal to the longitudinal direction. Blade thickness is a thickness in a direction that is orthogonal to the chord L in the blade 6. The cross-sectional maximum blade thickness L2 has been set in a position closer to the front end 6e between the front end 6e and the rear end 6f of the blade 6. In addition, as illustrated in FIG. 3, it is assumed that a propeller radius is the length of a straight line L3 that connects the rotation central axis C and a point (the distal end 6b) that has a longest distance from the rotation central axis C in the blade 6. Stated another way, the propeller radius matches a radius of a circle 10 that passes through the distal end 6b of the blade 6 with the rotation central axis C as a center. In addition, it is assumed that a propeller radial direction is a direction along the straight line L3. Stated another way, the propeller radial direction runs along direction D1 that runs from the rotation central axis C to the distal end 6b. In addition, the longitudinal direction of the blade 6 also runs along direction D1. Further, pitch is a distance of advance along the angle of elevation $\alpha$ of a cross section of a blade that is located in a distance of r from the rotation central axis C at a time when the propeller 5 rotates once. When it is assumed that the pitch is P, it is satisfied that $P=2\pi r \tan(\alpha)$.

Figure 5:
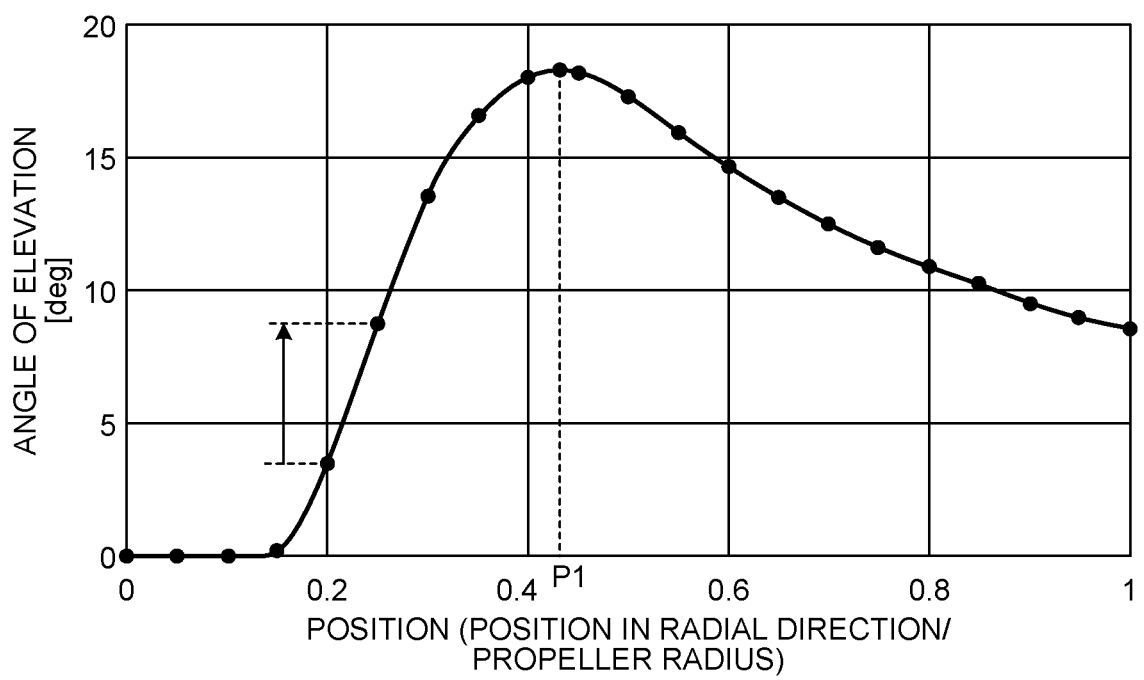
FIG. 5 is a diagram illustrating a relationship between an angle of elevation and a position in the propeller according to the first embodiment.
Figure 6:
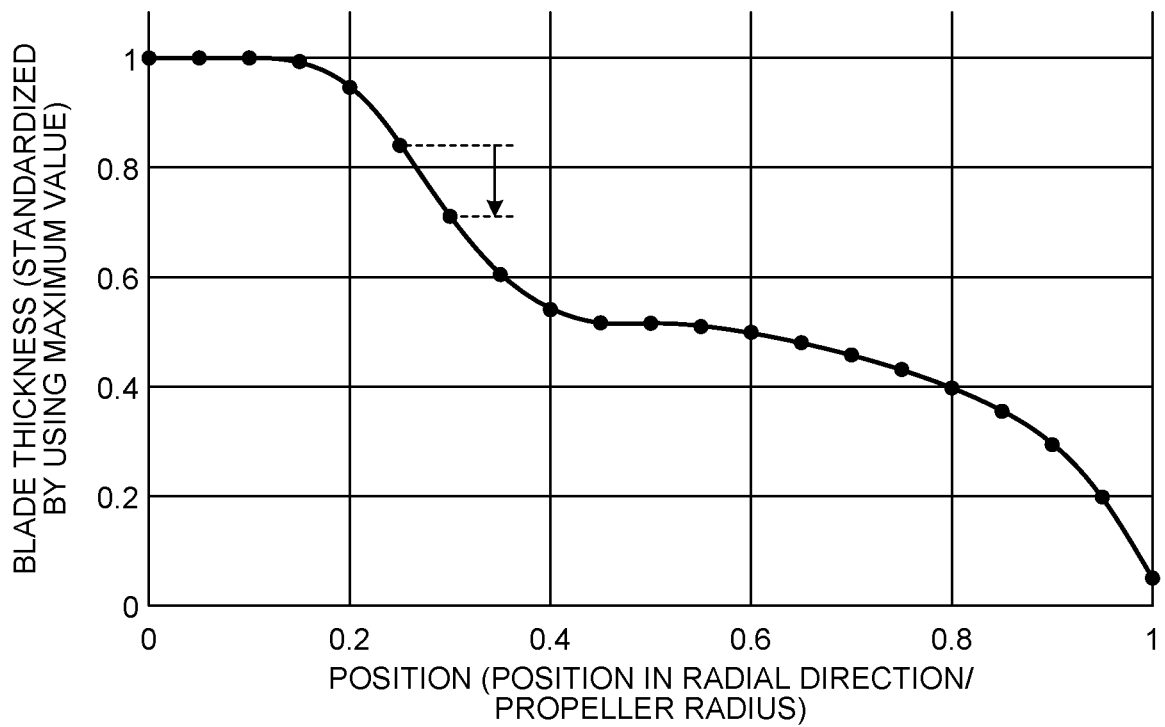
FIG. 6 is a diagram illustrating a relationship between a blade thickness and a position in a blade according to the first embodiment.
Figure 7:
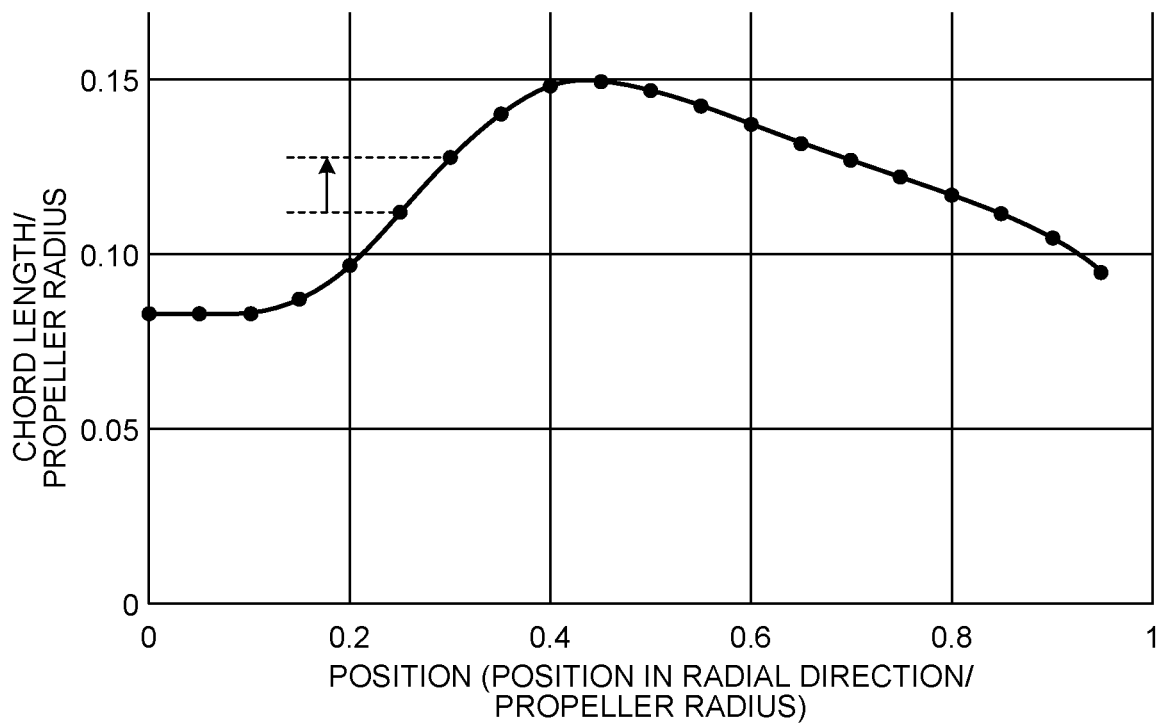
FIG. 7 is a diagram illustrating a relationship between a chord length and a position in the blade according to the first embodiment.
Figure 8:
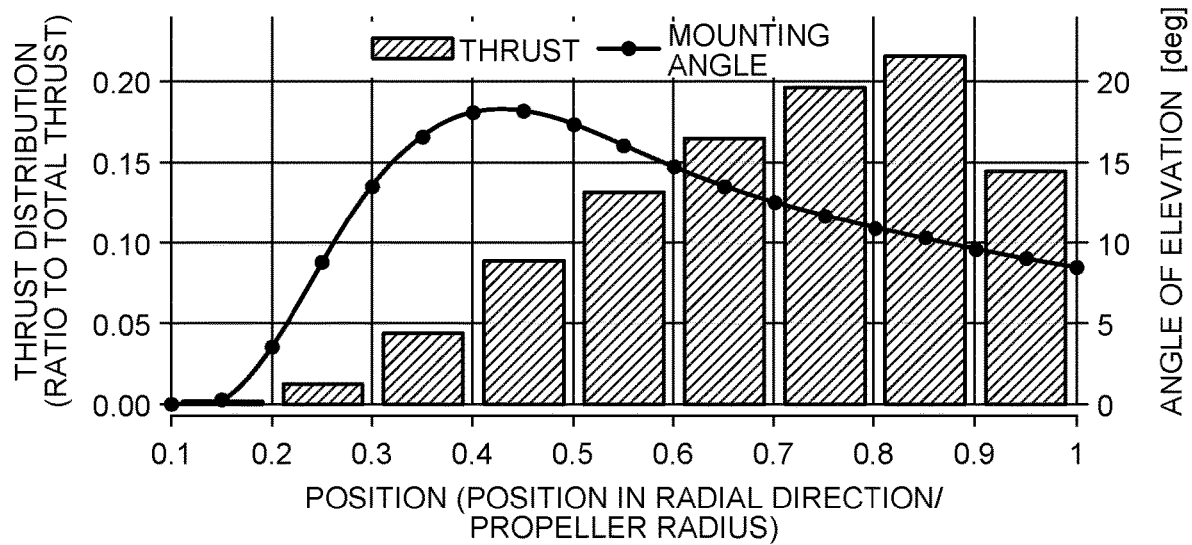
FIG. 8 is a diagram illustrating a relationship between thrust and an angle of elevation, and a position in the blade according to the first embodiment.

FIG. 5 is a diagram illustrating a relationship between the angle of elevation $\alpha$ and a position in the blade 6 according to the first embodiment. FIG. 6 is a diagram illustrating a relationship between the cross-sectional maximum blade thickness L2 and a position in the blade 6 according to the first embodiment. FIG. 7 is a diagram illustrating a relationship between the chord length L1 and a position in the blade 6 according to the first embodiment. FIG. 8 is a diagram illustrating a relationship between thrust and the angle of elevation $\alpha$, and a position in the blade 6 according to the first embodiment. A position (position in radial direction/propeller radius) on a horizontal axis in FIGS. 5 to 8 is indicated by using (distance from rotation central axis C in blade 6 to position in radial direction (longitudinal direction)/(distance from rotation central axis C to distal end 6b of blade 6). The position (position in radial direction/propeller radius) is also referred to as a propeller blade section.

As illustrated in FIGS. 3 and 5, the blade 6 has a maximum angle of elevation serving as a maximum angle of elevation $\alpha$ of the blade 6, in a position P1 ranging from 30% to 60% with the rotation central axis C as a starting point of a radius of the circle 10 that passes through the distal end 6b of the blade 6 with the rotation central axis C as a center, that is, the propeller radius. The maximum angle of elevation may range, for example, from 40% to 50% of the propeller radius. Note that hereinafter, a radius is the radius of the circle 10, that is, the propeller radius, unless otherwise specified.

In addition, as illustrated in FIG. 5, a change in the angle of elevation $\alpha$ in the longitudinal direction of the blade 6 is within 10 degrees per 5% of the radius. FIG. 5 illustrates that in the range illustrated by an arrow, a change in the angle of elevation $\alpha$ in the longitudinal direction of the blade 6 is within 10 degrees per 5% of the radius. However, in the entire region in the longitudinal direction of the blade 6, a change in the angle of elevation $\alpha$ in the longitudinal direction of the blade 6 is within 10 degrees per 5% of the radius.

In addition, as illustrated in FIG. 6, a change in the cross-sectional maximum blade thickness L2 of the blade 6 in the longitudinal direction of the blade 6 is within 20% of a maximum blade thickness in the blade 6 per 5% of the radius. A maximum blade thickness in a blade is reworded into a maximum blade thickness of cross-sectional maximum blade thicknesses L2 of the blade 6, and a maximum blade thickness in the entirety of the blade 6. FIG. 6 illustrates that in the range illustrated by an arrow, a change in the cross-sectional maximum blade thickness L2 of the blade 6 in the longitudinal direction of the blade 6 is within 20% of a maximum blade thickness of the blade 6 per 5% of the radius. However, in the entire region in the longitudinal direction of the blade 6, a change in the cross-sectional maximum blade thickness L2 of the blade 6 in the longitudinal direction is within 20% of a maximum blade thickness of the blade 6 per 5% of the radius.

In addition, as illustrated in FIG. 7, a change in the chord length L1 of the blade 6 in the longitudinal direction of the blade 6 is within 20% of a maximum chord length L1 in the blade 6 per 5% of the radius. A maximum chord length L1 in the blade 6 is reworded into a maximum chord length in the entirety of the blade 6. FIG. 7 illustrates that in the range illustrated by an arrow, a change in the chord length L1 of the blade 6 in the longitudinal direction of the blade 6 is within 20% of a maximum chord length L1 in the blade 6 per 5% of the radius. However, in the entire region in the longitudinal direction of the blade 6, a change in the chord length L1 of the blade 6 in the longitudinal direction of the blade 6 is within 20% of a maximum chord length L1 in the blade 6 per 5% of the radius.

In addition, as illustrated in FIGS. 3 and 5, the upper face 6c and the lower face 6d respectively include flat regions 6ca and 6cb that are orthogonal to the axis direction of the rotation central axis C, within 10% with the rotation central axis C as a starting point of the radius.

[1-4. Operation]

In the flying object 1 having the configuration described above, the propeller 5 rotates due to the driving of the motor 4, and therefore thrust is generated. Here, FIG. 8 is a diagram illustrating a relationship between thrust and an angle of elevation $\alpha$, and a position in the blade 6 according to the first embodiment. When the propeller 5 rotates, thrust, as illustrated in FIG. 8, is generated according to a position in a radial direction that serves as a position in the radial direction (a position in the longitudinal direction) in the blade 6.

[1-5. Propeller in Comparative Example]

Figure 9:
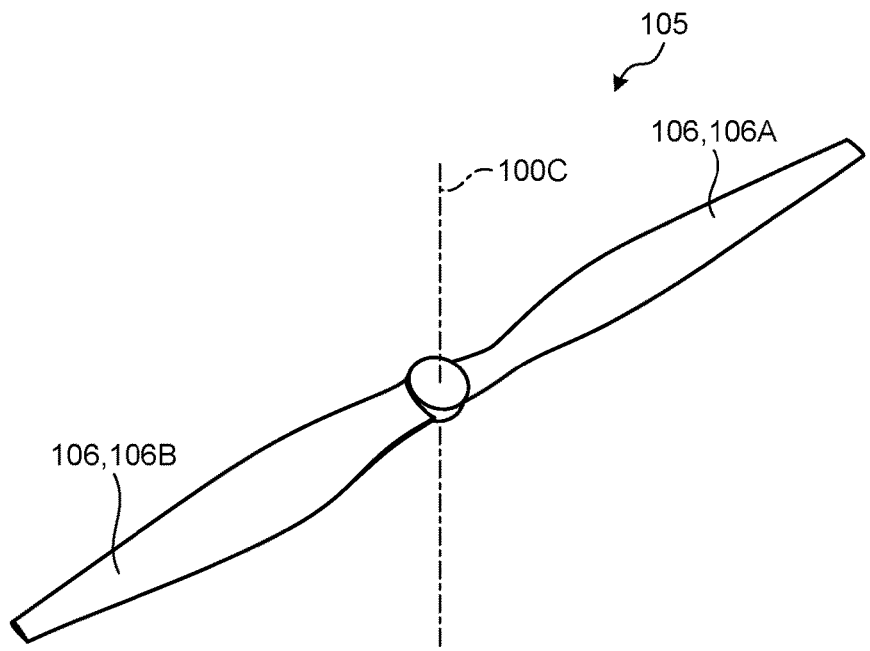
FIG. 9 is a perspective view of a propeller in a comparative example.
Figure 10:
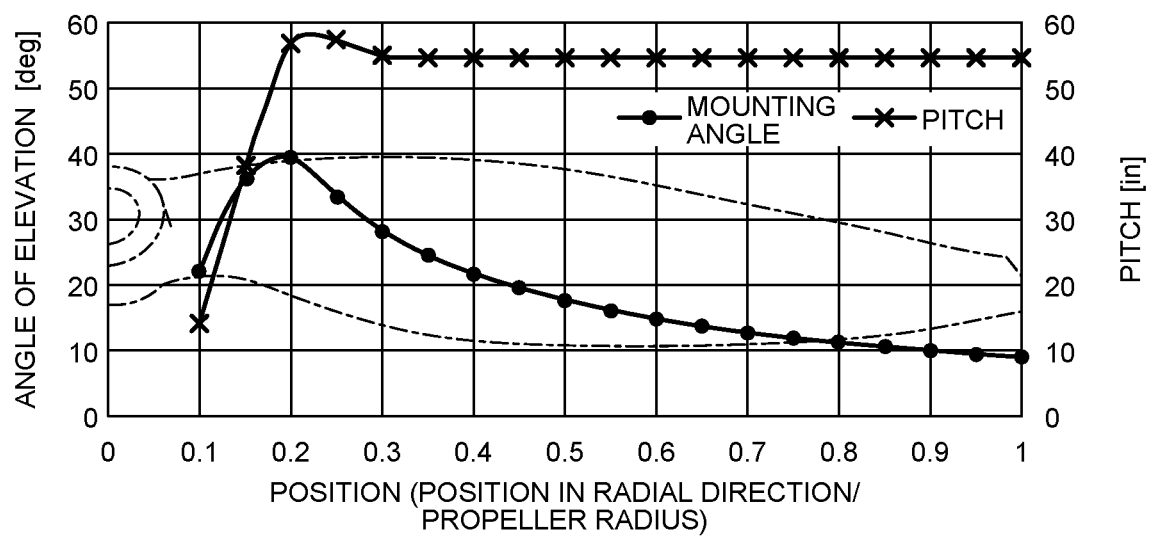
FIG. 10 is a diagram illustrating a relationship between an angle of elevation and pitch, and a position in a blade in the comparative example.
Figure 11:
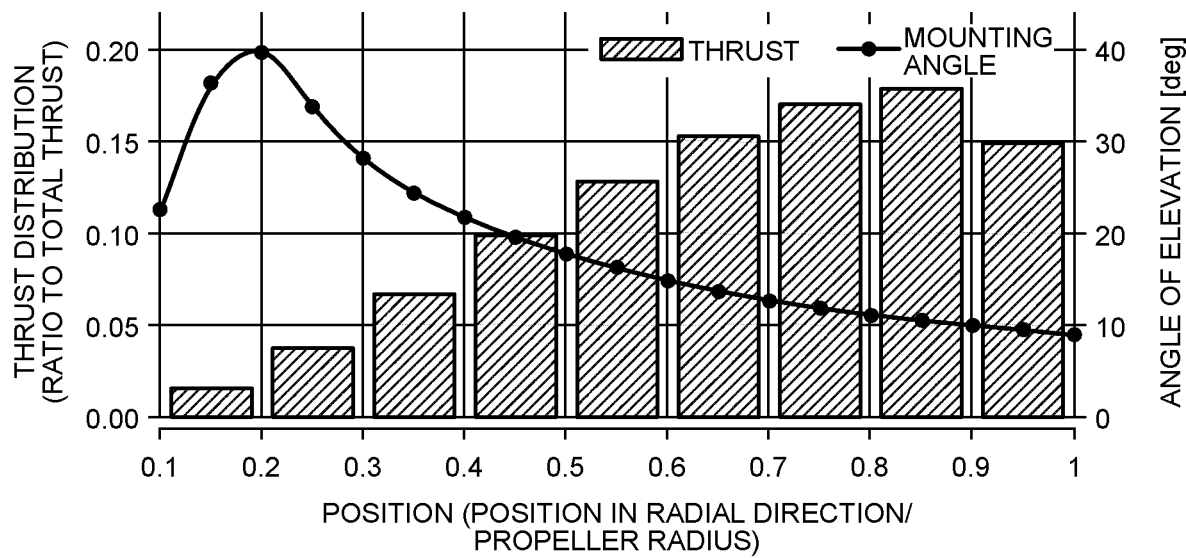
FIG. 11 is a diagram illustrating a relationship between thrust and an angle of elevation, and a position in the blade in the comparative example.

FIG. 9 is a perspective view of a propeller 105 in a comparative example. FIG. 10 is a diagram illustrating a relationship between an angle of elevation $\alpha$ and pitch, and a position in a blade 106 in the comparative example. FIG. 11 is a diagram illustrating a relationship between thrust and an angle of elevation $\alpha$, and a position in the blade 106 in the comparative example.

As illustrated in FIG. 9, the propeller 105 in the comparative example includes two blades 106A and 106B. Hereinafter, as a generic term of a plurality of blades 106A and 106B, a blade 106 is used. The two blades 106 extend outward in a radial direction of a rotation central axis 100C relative to the rotation central axis 100C. The two blades 106 extend to sides opposite to each other relative to the rotation central axis 100C. The two blades 106 have been formed integrally with each other, and configure a single member (individual). In addition, the blade 6 of the propeller 105 in the comparative example has an angle of elevation and pitch that are illustrated in FIG. 10. Further, thrust distribution of the blade 106 in the comparative example is illustrated in FIG. 11. In the comparative example, about 85% of thrust is generated on an outside in the radial direction of the rotation central axis 100C of 40% of a propeller radius with the rotation central axis 100C as a starting point. Here, in a fixed wing, a greater thrust is generated as an angle of elevation of the wing increases. However, in the propeller 105 serving as a rotary wing, the speed of advance in a rotation direction decreases in a position closer to the rotation central axis. Generated thrust of the propeller 105 is proportional to the square of the speed of advance. Therefore, in a portion near a root of the propeller 105 (a portion including a proximal end), an angle of elevation is large, but thrust is hardly generated.

Here, some propellers for small-sized and middle-sized unmanned aircrafts like the propeller 105 in the comparative example are products made of carbon, but in many cases, a resin molded product that uses, as a base material, plastic, nylon, or the like that is advantageous in terms of a cost is employed. Stress that is applied to a propeller during rotation of the propeller due to centrifugal force or a bending moment is concentrated in the vicinity of a rotation central axis in the propeller. Therefore, it is desired that the rigidity of a portion near a root (a proximal end) of a blade be increased. However, a conventional propeller has a wing shape that has a large angle of elevation in order to generate thrust in the portion near the root. In general, a shape that has pursued aerodynamic efficiency makes it difficult to increase rigidity, and therefore an upper limit of the speed of rotation of a propeller is restricted from the viewpoint of rigidity. Accordingly, in a case where a greater thrust is required, an option is either to increase the diameter of a propeller and achieve a high output even during low-speed rotation or to change a material itself of the propeller to a material having a high rigidity.

[1-6. Comparison Between Propeller According to First Embodiment and Comparative Example]

Figure 12:
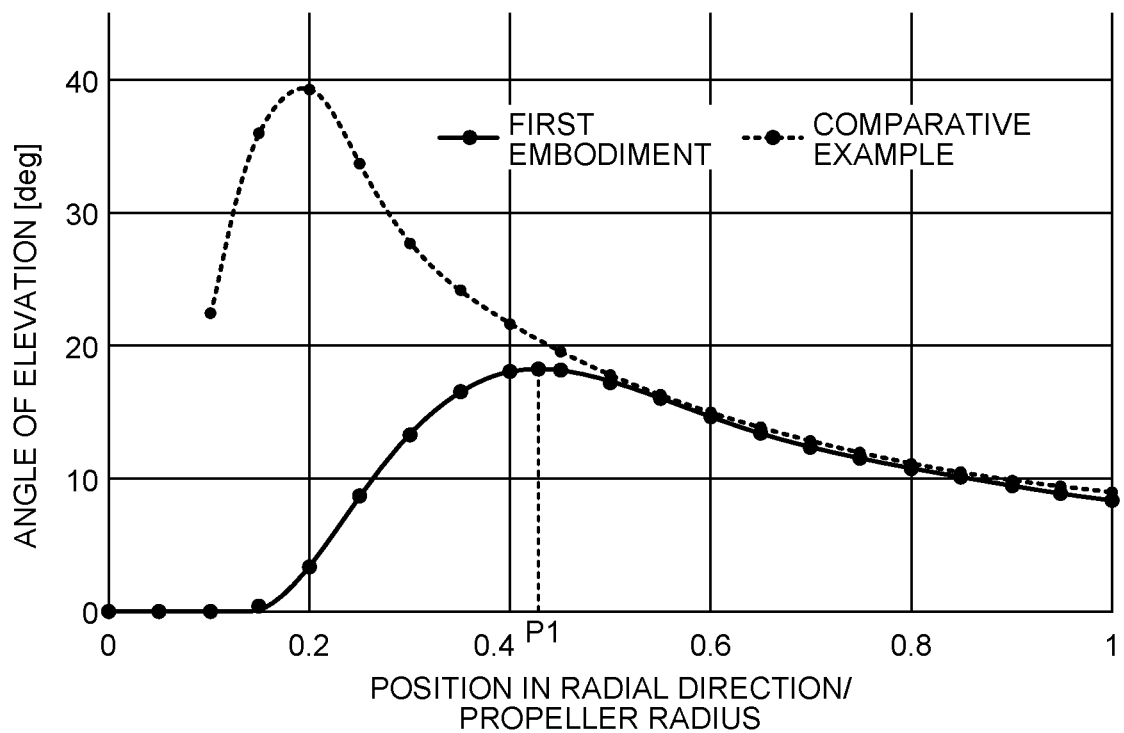
FIG. 12 is a diagram for comparing an angle of elevation between the blade according to the first embodiment and the blade in the comparative example.
Figure 13:
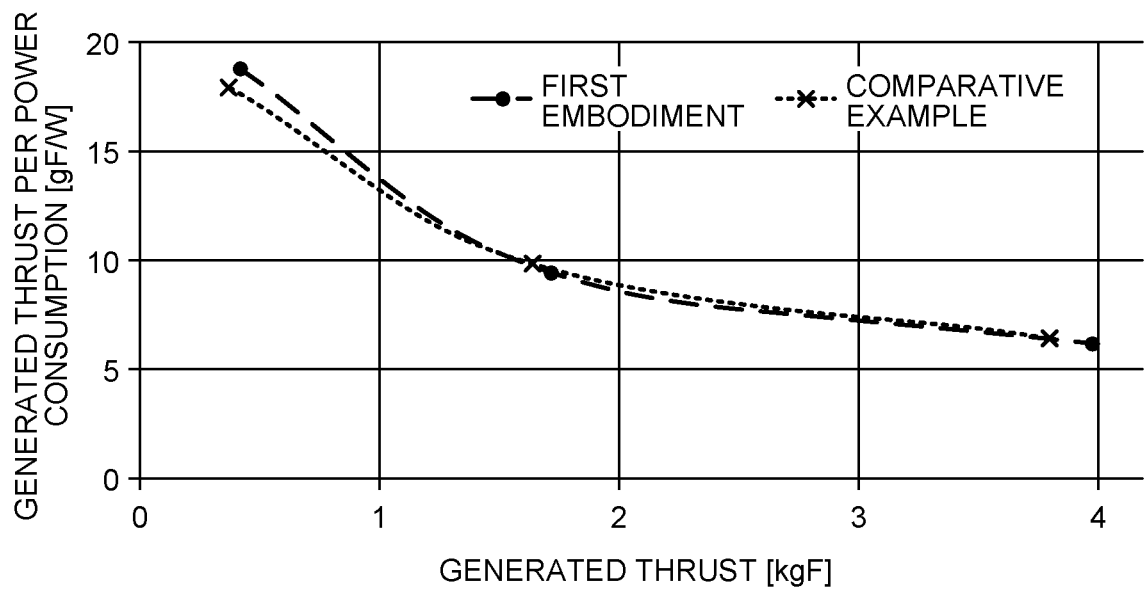
FIG. 13 is a diagram for comparing generated thrust per power consumption between the blade according to the first embodiment and the blade in the comparative example.

FIG. 12 is a diagram for comparing an angle of elevation between the blade 6 according to the first embodiment and the blade 106 in the comparative example. FIG. 13 is a diagram for comparing generated thrust per power consumption between the blade 6 according to the first embodiment and the blade 106 in the comparative example.

As illustrated in FIG. 12, an angle of elevation differs between the blade 6 according to the present embodiment and the blade 106 in the comparative example. As is apparent from FIG. 12, a maximum angle of elevation of the blade 6 according to the present embodiment is located on a more outer side in the radial direction of the rotation central axis C than a maximum angle of elevation of the blade 106 in the comparative example. Then, in the blade 6, an angle of elevation gradually decreases toward a side of the rotation central axis C from the position P1 of the maximum angle of elevation. At this time, in the blade 6, a cross-sectional maximum blade thickness L2 gradually increases toward the side of the rotation central axis C from the position P1 of the maximum angle of elevation. The reason for employing such a shape is that a cross-sectional shape does not necessarily need to be a wing shape in which aerodynamic efficiency has been considered in a portion closer to the rotation central axis C than the maximum angle of elevation in the blade 6, a shape in which priority has been given to an increase in resistance to bending is employed, and a discontinuous shape in which that stress is likely to be concentrated is avoided. On the other hand, the blade 106 in the comparative example includes a portion where a cross section that is orthogonal to the longitudinal direction suddenly changes in the longitudinal direction, and stress is likely to be concentrated in the portion. In contrast, the blade 106 according to the present embodiment has the shape described above, and therefore a cross section does not suddenly change in the longitudinal direction. Stated another way, the blade 6 according to the present embodiment has a shape that is continuous in the longitudinal direction. Here, a blade of a general propeller has been designed in such a way that an angle of elevation increases toward a proximal end from a distal end of the blade, in order to make pitch constant. However, in the blade 6 according to the present embodiment, pitch is intentionally made inconstant, and therefore the shape described above is achieved. By employing such a shape of the blade 6, concentration of stress can be prevented from occurring in the blade 6. In addition, as illustrated in FIG. 13, in the blade 6 according to the present embodiment and the blade 106 in the comparative example, generated thrust per power consumption is roughly the same overall. Stated another way, in the blade 6 according to the present embodiment, rigidity and strength are improved in a root part (a portion including the proximal end 6a) on which a greatest load is imposed, in a state where a decrease in the efficiency of generating thrust in the entirety of the propeller 5 is avoided. In addition, by employing such a shape of the blade 106, transfer accuracy is improved in the injection molding described next.

In addition, an amount of deflection of the distal end 6b at the time of applying a force in the axis direction to the distal end 6b of the blade 6 according to the present embodiment is smaller by 20% than an amount of deflection of the blade 106 in the comparative example. Specifically, the rigidity and strength of the blade 6 according to the present embodiment increase by 20% or more in comparison with the blade 106 in the comparative example. In addition, a resonance frequency of the blade 6 according to the present embodiment increases by 20% in comparison with a resonance frequency of the blade 106 in the comparative example. This enables the blade 6 to rotate at higher speed than the speed of the blade 106 in the comparative example. Accordingly, the resonance frequency is easily caused to deviate from a range of the operation rotation speed of the propeller 5. Note that in a conventional propeller like the propeller 104 in the comparative example, even if a resonance mode can be caused to deviate from an operation rotation speed zone of the propeller, internal stress caused by a bending moment or a torsion moment is similarly concentrated in a root of a blade. Accordingly, it is desirable that the rigidity and strength of a root part of a propeller be increased.

[1-7. Method for Manufacturing Propeller According to First Embodiment]

Figure 14:
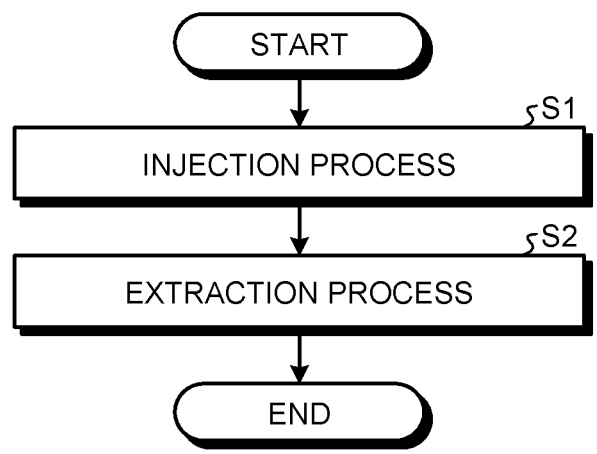
FIG. 14 is a flowchart illustrating a method for manufacturing the propeller according to the first embodiment.
Figure 15:
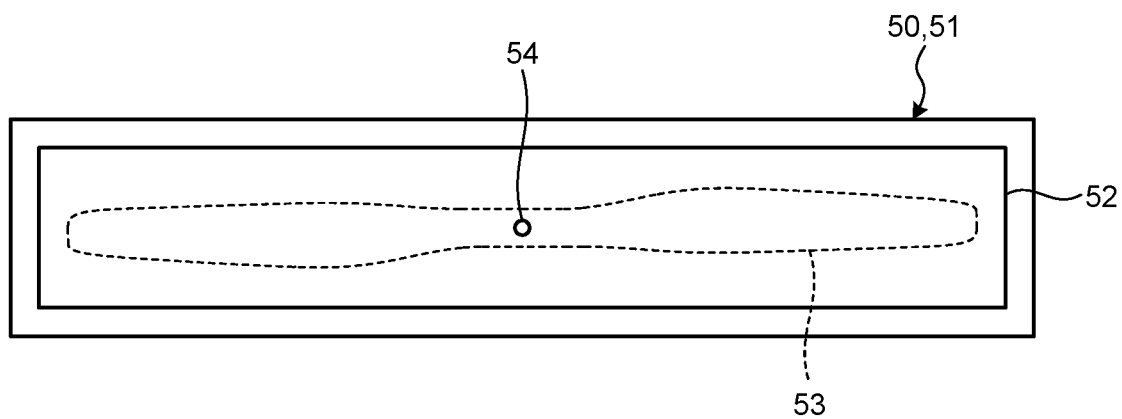
FIG. 15 is a plan view of a mold that is used in the method for manufacturing the propeller according to the first embodiment.

FIG. 14 is a flowchart illustrating a method for manufacturing the propeller 5 according to the first embodiment. FIG. 15 is a plan view of a mold 50 that is used in the method for manufacturing the propeller 5 according to the first embodiment.

As illustrated in FIG. 14, an injection process is performed by using an injection molding machine (S1). The injection molding machine includes the mold 50 illustrated in FIG. 15. The mold 50 is used to form the propeller 5 (the blade 6). The mold 50 includes a lower mold 51, and an upper mold 52 that is superimposed onto the lower mold 51. A cavity 53 is provided between the lower mold 51 and the upper mold 52. In addition, in the upper mold 52, a gate 54 that leads to the cavity 53 is provided. The gate leads to a central part of the cavity 53. Stated another way, the gate 54 faces a central part of the propeller 5 to be formed. The injection molding machine injects a material in a melted state into the cavity 53 of the mold 50 from the gate 54, and fills the cavity 53 with the material. At this time, the material flows from the central part of the cavity 53 toward an end part. The cavity 53 has a shape that corresponds to a shape of the propeller 5 to be manufactured, and therefore material fluidity is satisfactory. This avoids a backward flow of the material in the cavity 53. Here, for example, in the case of a conventional mold that is used to manufacture the propeller 105 in the comparative example, a cavity has a complicated shape, and therefore fluidity is low. In the conventional mold, in order to fill the entirety of the cavity with a material in a state where a backward flow of the material is avoided, it is necessary to increase the temperature of the mold, and inject the material. In this case, a rate of shrinkage of the material after cooling increases, and transferability deteriorates. Moreover, in a propeller that has been manufactured by using the conventional mold, internal residual stress also increases, and therefore alleaning processing is needed. This causes a shape of the propeller to be changed from a designed shape, and therefore transferability further deteriorates. In contrast, the mold 50 according to the present embodiment has satisfactory material fluidity and satisfactory transferability, and therefore an increase in temperature in the mold 50 or annealing processing can be reduced or eliminated. Note that the material is the thermoplastic resin described above, such as a carbon fiber-reinforced thermoplastic resin or a polyamide resin-based material.

In a case where the material of the propeller 5 is the carbon fiber-reinforced thermoplastic resin or the polyamide resin-based material, strength can be further improved, but friction against the mold 50 is likely to increase. Therefore, for example, in the case of the conventional mold that is used to manufacture the propeller 105 in the comparative example, the durability of the mold deteriorates, and this results in an increase in a manufacturing cost. In contrast, the mold 50 according to the present embodiment has satisfactory material fluidity, and therefore friction between a material and the mold 50 can be easily reduced in comparison with the conventional mold. Accordingly, the durability of the mold is improved, and as a result, a manufacturing cost can be reduced.

Next, as illustrated in FIG. 14, a working subject, such as a worker or an extraction device, separates the lower mold 51 from the upper mold 52, and extracts a solidified material from the mold 50 (S2). Next, the working subject, such as the worker or a processing device, removes a portion other than the propeller 5, for example, a portion that has been formed due to the gate 54, of the solidified material. By doing this, the propeller 5 is manufactured.

[1-8. Effects]

As described above, the propeller 5 according to the present embodiment includes a plurality of blades 6. The plurality of blades 6 extends outward in a radial direction of the rotation central axis C relative to the rotation central axis C. The blade 6 includes the distal end 6b (an end) that is located on an opposite side of the rotation central axis. The blade 6 has a maximum angle of elevation serving as a maximum angle of elevation α of the blade 6, in a position ranging from 30% to 60% with the rotation central axis C as a starting point in a radius of the circle 10 that passes through the distal end 6b of the blade 6 with the rotation central axis C as a center. A change in an angle of elevation α in a longitudinal direction of the blade 6 is within 10 degrees per 5% of the radius. A change in the longitudinal direction in a cross-sectional maximum blade thickness L2 serving as a maximum blade thickness in a cross section of the blade 6 that is orthogonal to the longitudinal direction of the blade 6 is within 20% of the maximum blade thickness in the blade 6 per 5% of the radius. A change in a chord length L1 of the blade 6 in the longitudinal direction is within 20% of a maximum chord length L1 in the blade 6 per 5% of the radius.

By employing such a configuration, the strength of a portion near the rotation central axis C of the propeller 5 can be improved. Here, if strength is insufficient, vibration occurs in a propeller when the propeller rotates, and wind noise is likely to increase. In contrast, the propeller 5 according to the present embodiment has a relatively great strength, and therefore vibration can be prevented from occurring in the propeller 5, and this enables wind noise to be reduced. In addition, the propeller 5 has a relatively great strength, and therefore the resonance frequency of the propeller 5 is easily increased. Thus, the speed of rotation of the propeller 5 is easily increased while the resonance of the propeller 5 is prevented from occurring. In addition, in a case where the propeller 5 is injection-molded, transfer accuracy can be improved.

In addition, in the present embodiment, the number of blades 6 is any one of two to four, and a plurality of blades 6 is formed integrally with each other, and configures a single member.

By employing such a configuration, the number of parts of the propeller 5 is easily reduced.

In addition, in the present embodiment, the blade 6 has a maximum chord length L1 in any one of a position within 10% on a side of the rotation central axis C of a radius, and a position within 10% on an opposite side of the rotation central axis C of the radius, relative to a position of a maximum angle of elevation in the blade 6.

By employing such a configuration, the strength of a portion near the rotation central axis C of the propeller 5 can be further improved.

In addition, in the present embodiment, the blade 6 includes the upper face 6c and the lower face 6d (faces) that are located in sides opposite to each other in an axis direction of the rotation central axis C. The upper face 6c and the lower face 6d respectively include flat regions 6ca and 6cb that are orthogonal to the axis direction of the rotation central axis C, within 10% with the rotation central axis C as a starting point of the radius.

By employing such a configuration, the strength of a portion near the rotation central axis C of the propeller 5 can be further improved.

In addition, in the present embodiment, a material of the blade 6 is a thermoplastic resin. As an example, the thermoplastic resin is a carbon fiber-reinforced thermoplastic resin. As another example, the thermoplastic resin is a polyamide resin-based material.

By employing such a configuration, the blade 6 can be manufactured by performing injection molding.

In addition, the flying object 1 according to the present embodiment includes the propeller 5 and the motor 4 (a driving source) that drives the propeller 5.

By employing such a configuration, a flying object 1 in which the strength of a portion near the rotation central axis C of the propeller 5 has been improved can be obtained.

In addition, a method for manufacturing the propeller 5 according to the present embodiment includes an injection process for injecting a material in a melding state into the mold 50 that is used to form the blade 6 of the propeller 5, and an extraction process for extracting the solidified material from the mold 50.

By employing such a configuration, a propeller 5 in which the strength of a portion near the rotation central axis C has been improved can be manufactured.

2. Second Embodiment

[2-1. Configuration of Propeller Propelling System According to Second Embodiment]

Figure 16:
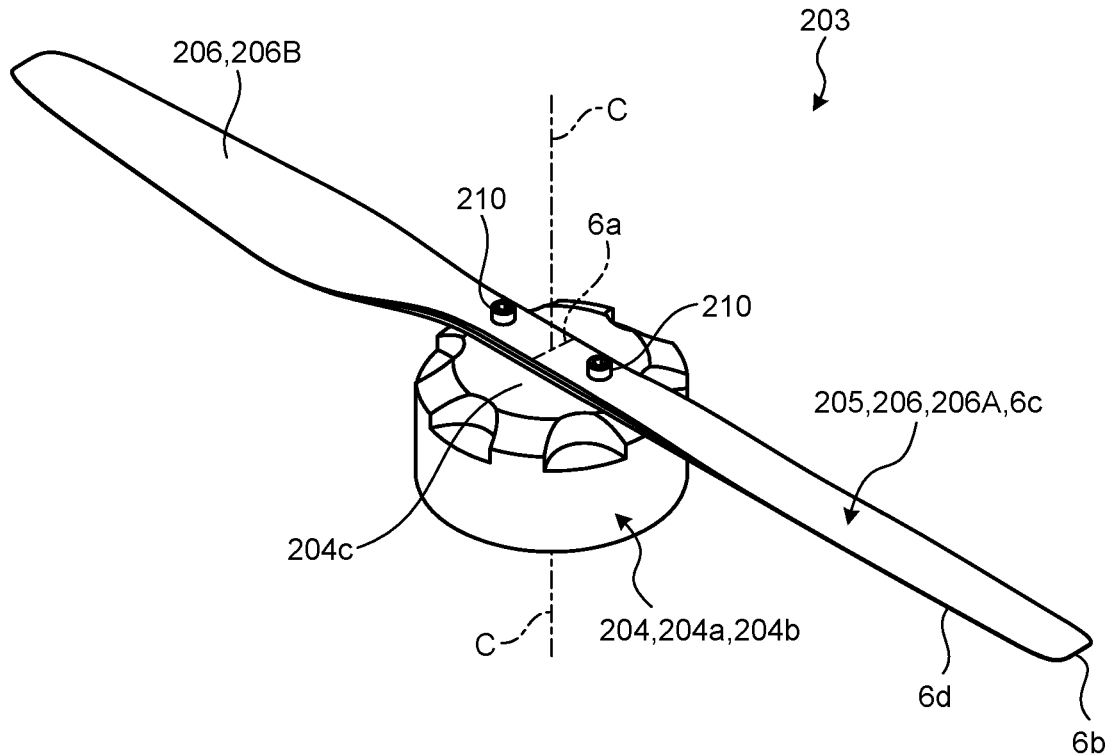
FIG. 16 is a perspective view of a propeller propelling system according to a second embodiment of the present disclosure.

FIG. 16 is a perspective view of a propeller propelling system 203 according to a second embodiment of the present disclosure.

As illustrated in FIG. 16, the propeller propelling system 203 according to the present embodiment includes a motor 204 and a propeller 205 by replacing the motor 4 and the propeller 5. The propeller 205 is directly fixed to the motor 204 by using a joint 210 such as a screw. The motor 204 is different from the motor 4 in that two internal threads (not illustrated) by which the joint 210 is joined to a rotor 204a are provided, and in the other portion, the motor 204 is similar to the motor 4. Specifically, the rotor 204a includes a cylinder 204b, and a mounting wall 204c that covers an opening in one end part of the cylinder 204b, and the internal threads are provided in the mounting wall 204c.

The propeller 205 includes two blades 206A and 206B. Hereinafter, as a generic term of the blades 206A and 206B, a blade 206 is used. The blade 206 is different from the blade 6 in that a through-hole (not illustrated) into which the joint 210 is inserted is provided, and in the other portion, the blade 206 is similar to the blade 6. The propeller 205 is manufactured by performing injection molding similarly to the propeller 5.

[2-3. Effects]

As described above, in the present embodiment, the blade 6 is fixed to the motor 204 by using the joint 210 such as a screw, and therefore the blade 6 is easily exchanged.

[2-4. Variations]

Figure 17:
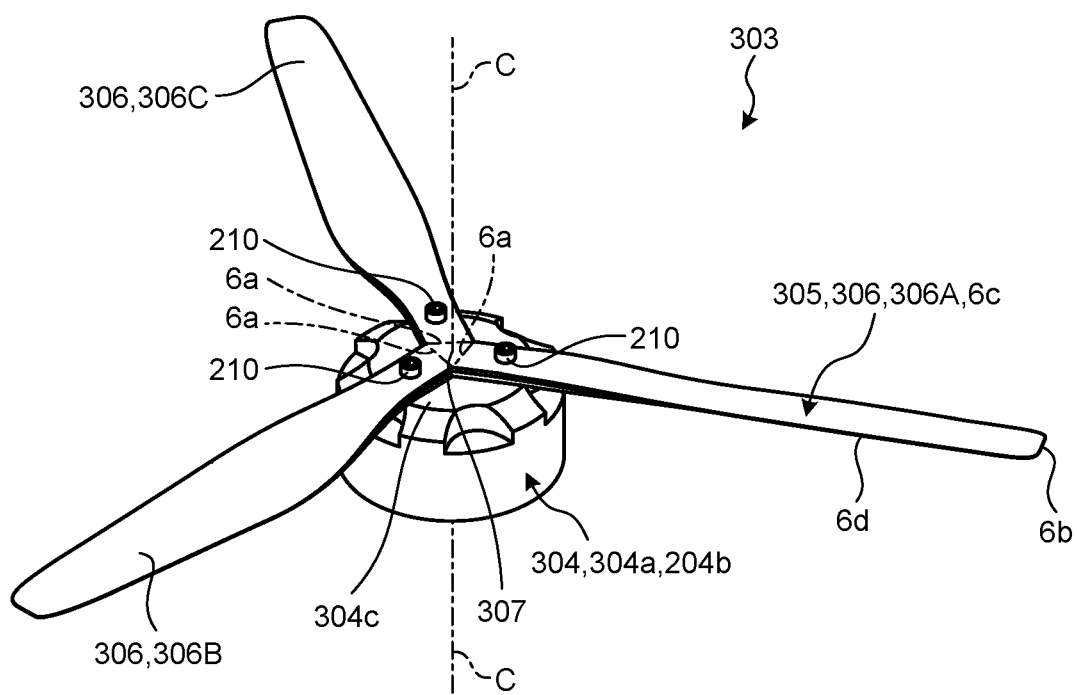
FIG. 17 is a perspective view of a propeller propelling system in a first variation of the second embodiment.

FIG. 17 is a perspective view of a propeller propelling system 303 in a first variation of the second embodiment. As illustrated in FIG. 17, the propeller propelling system 303 includes a motor 304 and a propeller 305 by replacing the motor 204 and the propeller 205. The propeller 305 is directly fixed to the motor 304 by using the joint 210 such as a screw. The motor 304 is different from the motor 204 in that three internal threads (not illustrated) by which the joint 210 is joined to a mounting wall 304c of a rotor 304a are provided, and in the other portion, the motor 304 is similar to the motor 204.

The propeller 305 includes three blades 306A, 306B, and 306C, and a connecting part 307. Hereinafter, as a generic term of the blades 306A, 306B, and 306C, a blade 306 is used. Three blades 306 are different from the blades 206 in that proximal ends 6a are connected to each other by using the connecting part 307, and in the other portion, the blades 306 are similar to the blades 206. The propeller 305 is manufactured by performing injection molding similarly to the propeller 5.

Figure 18:
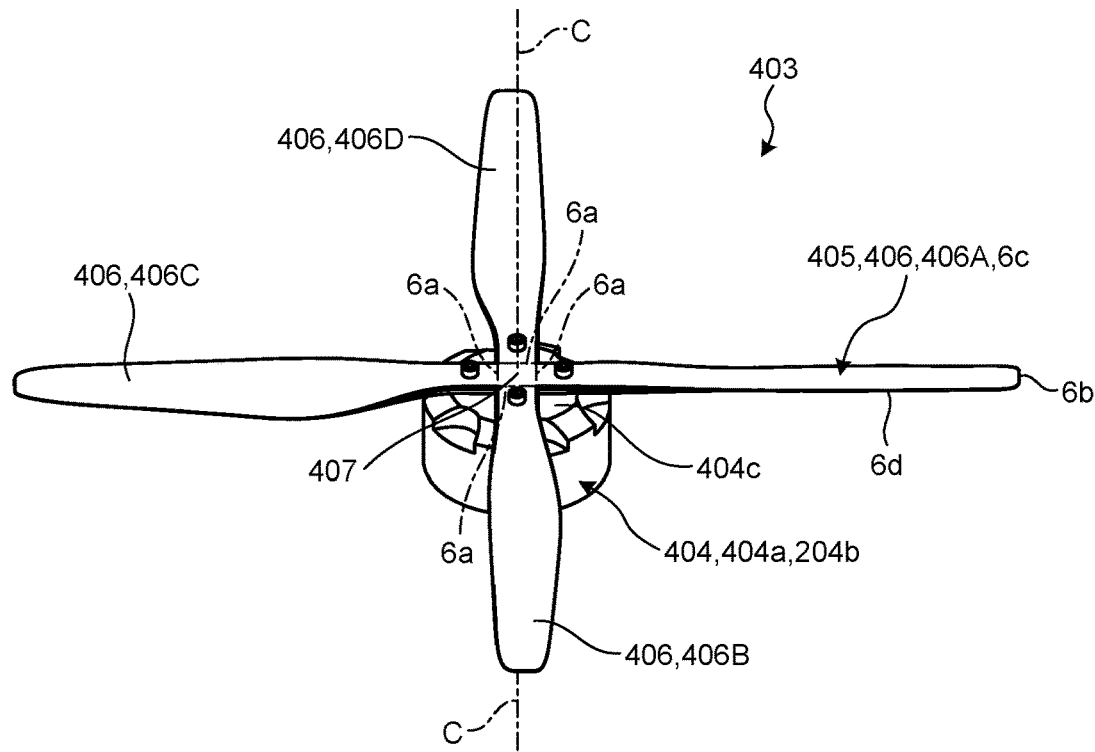
FIG. 18 is a perspective view of a propeller propelling system in a second variation of the second embodiment.

FIG. 18 is a perspective view of a propeller propelling system 403 in a second variation of the second embodiment. As illustrated in FIG. 18, the propeller propelling system 403 includes a motor 404 and a propeller 405 by replacing the motor 204 and the propeller 205. The propeller 405 is directly fixed to the motor 404 by using the joint 210 such as a screw. The motor 404 is different from the motor 204 in that four internal threads (not illustrated) by which the joint 210 is joined to a mounting wall 404c of a rotor 404a are provided, and in the other portion, the motor 404 is similar to the motor 204.

The propeller 405 includes four blades 406A, 406B, and 406C, and a connecting part 407. Hereinafter, as a generic term of the blades 406A, 406B, and 406C, a blade 406 is used. Four blades 406 are different from the blades 206 in that the proximal ends 6a are connected to each other by using the connecting part 407, and in the other portion, the blades 406 are similar to the blades 206. The propeller 405 is manufactured by performing injection molding similarly to the propeller 5.

The number of blades 306 or 406 of the propeller 305 or 405 in each of the comparative examples described above is greater than the number of blades 206 of the propeller 205, and therefore the propellers 305 and 405 can obtain a high output at lower speed of rotation than the propeller 205. On the other hand, the number of blades 206 of the propeller 205 is smaller than the number of blades 306 or 406 of the propeller 305 or 405, and therefore the propeller 205 has a higher efficiency of generating thrust than the propellers 305 and 405.

3. Third Embodiment

[3-1. Configuration of Propeller Propelling System According to Third Embodiment]

Figure 19:
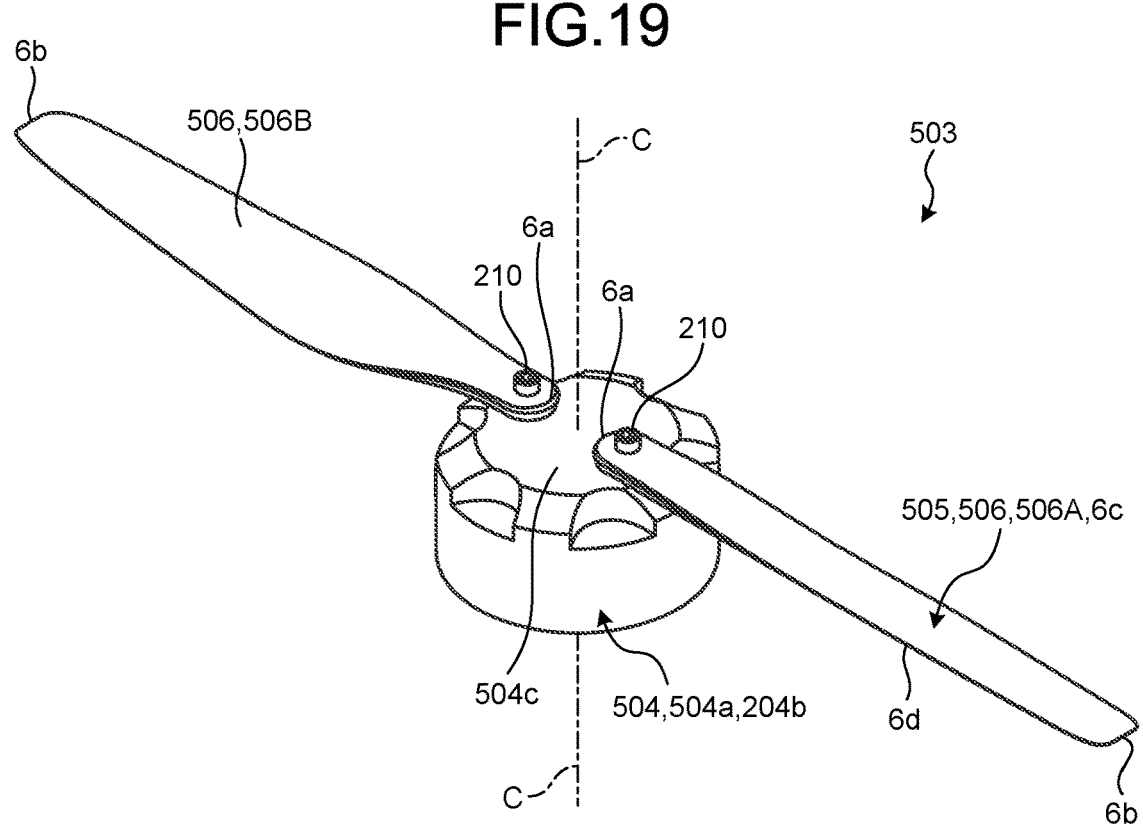
FIG. 19 is a perspective view of a propeller propelling system according to a third embodiment of the present disclosure, and is a view illustrating a propeller in a spread state.
Figure 20:
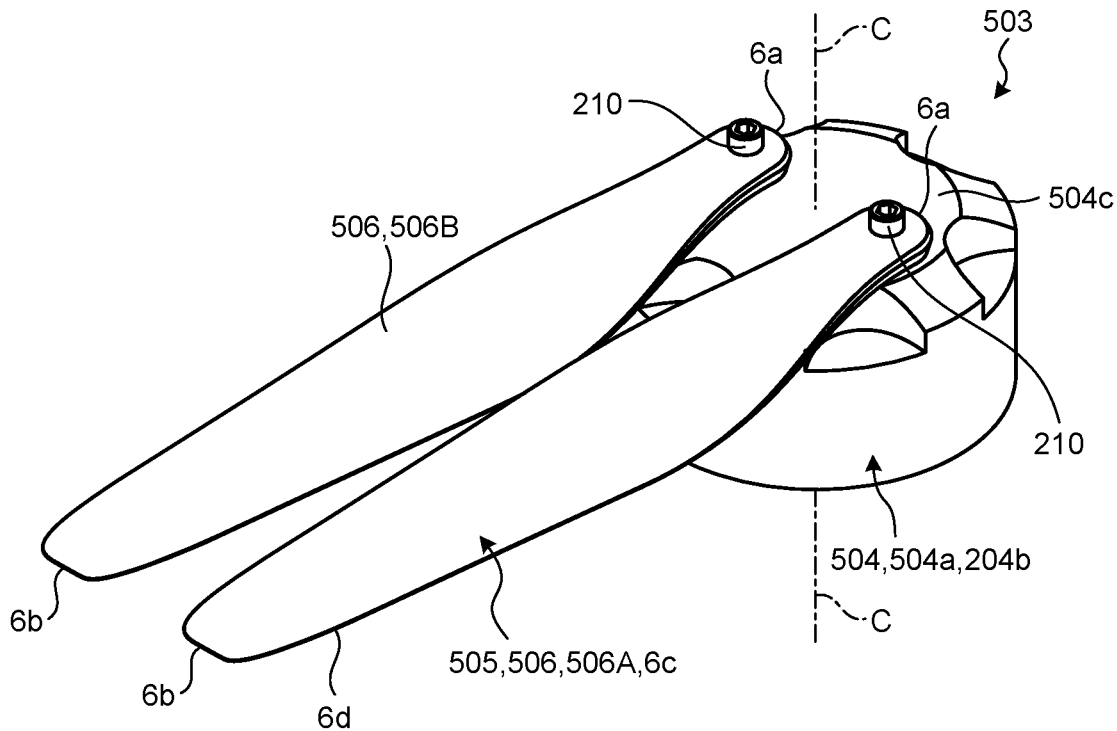
FIG. 20 is a perspective view of the propeller propelling system according to the third embodiment, and is a view illustrating the propeller in a folded state.

FIG. 19 is a perspective view of a propeller propelling system 503 according to a third embodiment of the present disclosure, and is a view illustrating a propeller 505 in the spread state. FIG. 20 is a perspective view of the propeller propelling system 503 according to the third embodiment, and is a view illustrating the propeller 505 in the folded state.

As illustrated in FIG. 19, the propeller propelling system 503 according to the present embodiment includes a motor 504 and the propeller 505 by replacing the motor 4 and the propeller 5. Blades 506A and 506B of the propeller 505 are directly fixed to the motor 504 by using a joint 210 such as a screw. The motor 504 is different from the motor 4 in that two internal threads (not illustrated) by which the joint 210 is joined to a rotor 504a are provided, and in the other portion, the motor 504 is similar to the motor 4. Specifically, the rotor 504a includes a cylinder 204b, and a mounting wall 504c that covers an opening in one end part of the cylinder 204b, and the internal threads are provided in the mounting wall 504c.

The propeller 505 includes two blades 506A and 506B. Hereinafter, as a generic term of the blades 506A and 506B, a blade 506 is used. Two blades 506 are different from the blades 6 in that the two blades 506 have been formed separately from each other, and are coupled to each other by using the mounting wall 504c serving as a coupling member, and a through-hole (not illustrated) into which the joint 210 is inserted is provided. In the other portion, the two blades 506 are similar to the blades 6. Each of the blades 506 is manufactured by performing injection molding similarly to the propeller 5. The mounting wall 504c is also referred to as a mounting part.

The blades 506 have been rotatably provided in an operation position (FIG. 19) where thrust is generated at the time of rotation of the propeller 505, and a folded position (FIG. 20) with the joint 210 as a center.

[3-3. Effects]

As described above, in the present embodiment, the blades 6 have been rotatably provided in the operation position (FIG. 19) and the folded position (FIG. 20). Accordingly, the propeller 505 can be caused to enter into the folded state (FIG. 20).

[3-4. Variations]

Figure 21:
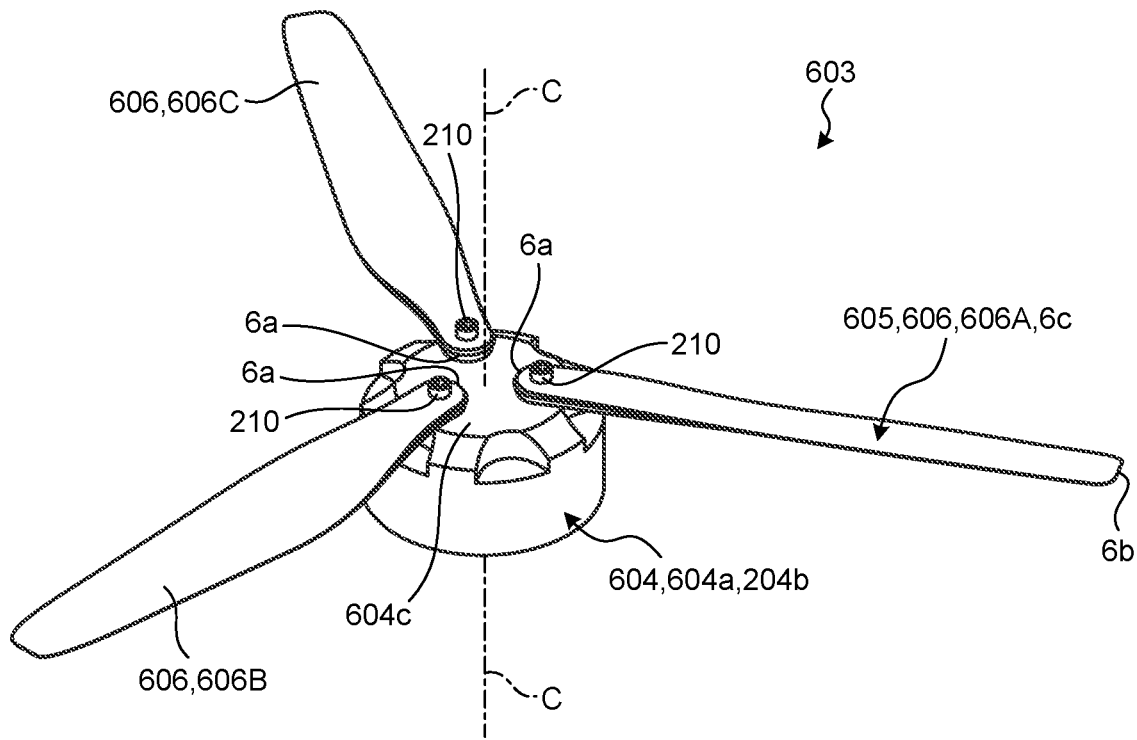
FIG. 21 is a perspective view of a propeller propelling system in a first variation of the third embodiment, and is a view illustrating a propeller in the spread state.
Figure 22:
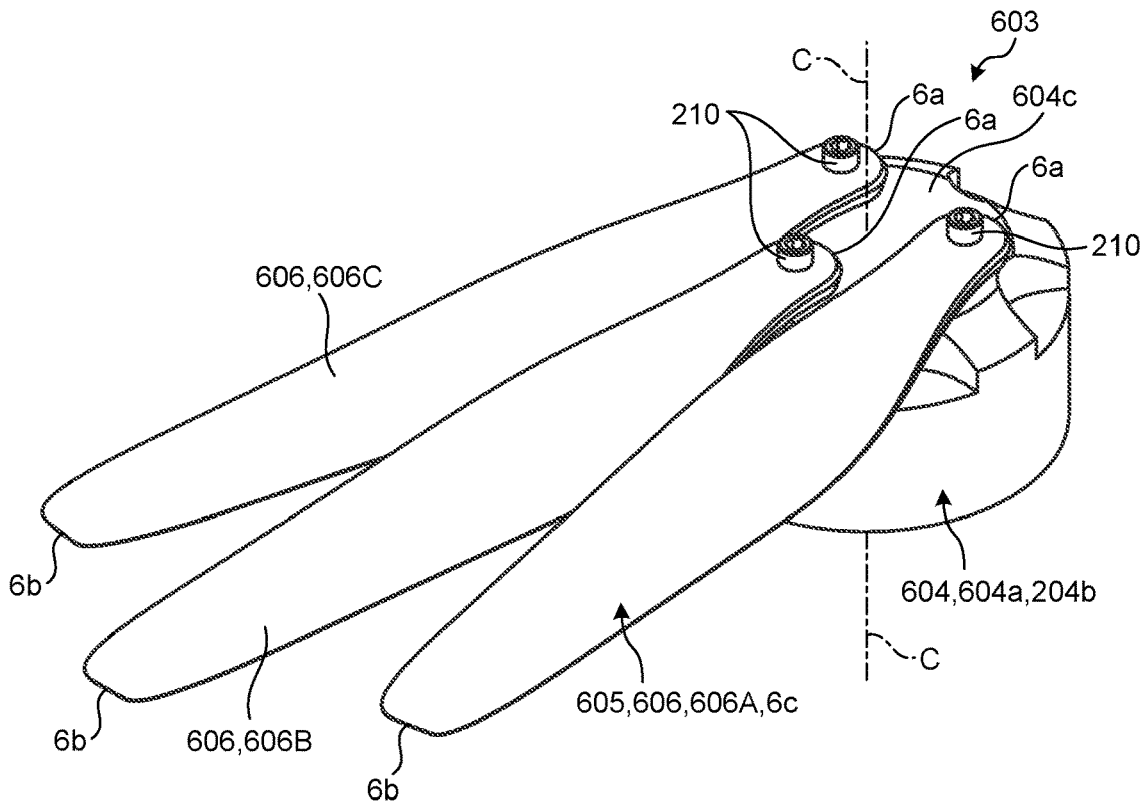
FIG. 22 is a perspective view of the propeller propelling system in the first variation of the third embodiment, and is a view illustrating the propeller in the folded state.

FIG. 21 is a perspective view of a propeller propelling system 603 in a first variation of the third embodiment, and is a view illustrating a propeller 605 in the spread state. FIG. 22 is a perspective view of the propeller propelling system 603 in the first variation of the third embodiment, and is a view illustrating the propeller 605 in the folded state.

As illustrated in FIG. 21, the propeller propelling system 603 includes a motor 604 and the propeller 605 by replacing the motor 504 and the propeller 505. The motor 604 is different from the motor 504 in that three internal threads (not illustrated) by which the joint 210 is joined to a mounting wall 604c of a rotor 604a are provided, and in the other portion, the motor 604 is similar to the motor 504.

The propeller 605 is different from the propeller 505 in that three blades 606A, 606B, and 606C are included, and in the other portion, the propeller 605 is similar to the propeller 505. Hereinafter, as a generic term of the blades 606A, 606B, and 606C, a blade 606 is used. Blades 606 have been rotatably provided in the operation position (FIG. 21) where thrust is generated at the time of rotation of the propeller 605, and the folded position (FIG. 22) with the joint 210 as a center. Each of the blades 606 is manufactured by performing injection molding similarly to the propeller 5.

Figure 23:
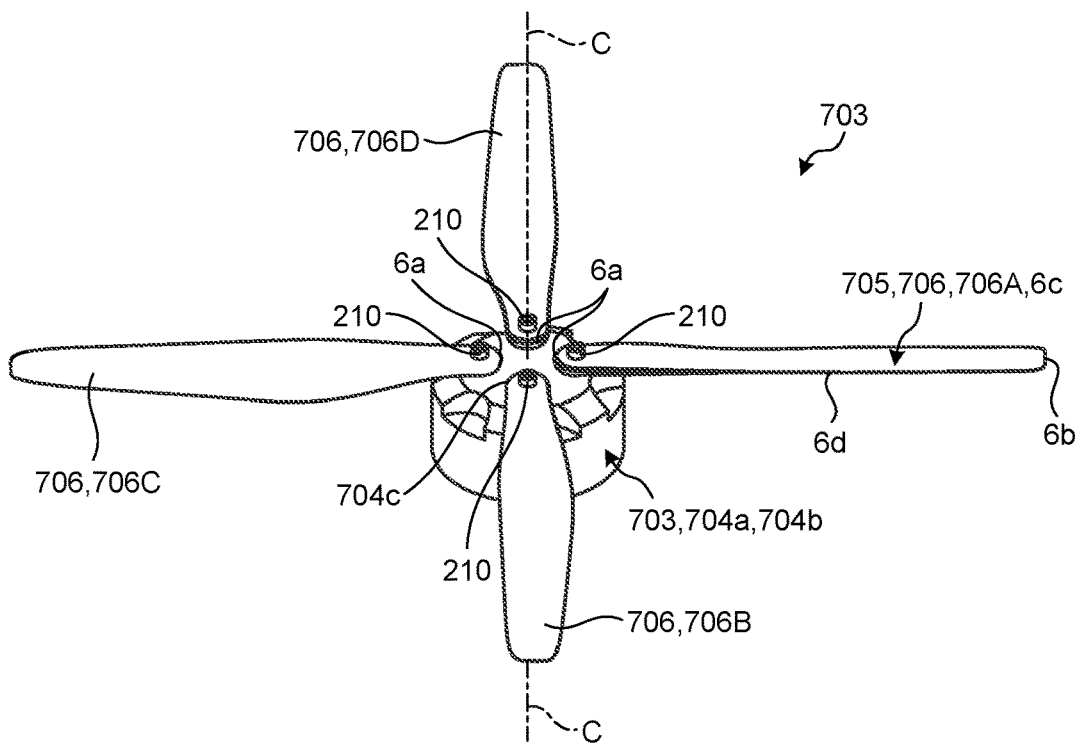
FIG. 23 is a perspective view of a propeller propelling system in a second variation of the third embodiment, and is a view illustrating a propeller in the spread state.
Figure 24:
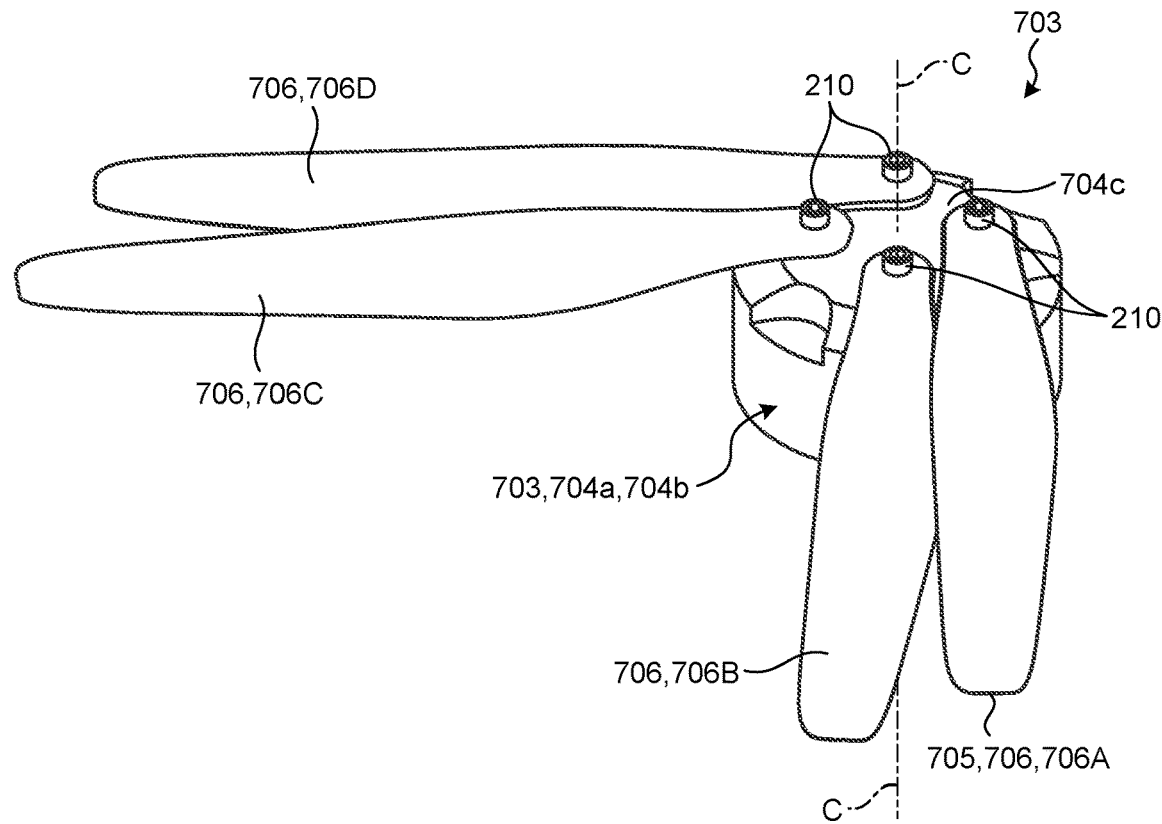
FIG. 24 is a perspective view of the propeller propelling system in the second variation of the third embodiment, and is a view illustrating the propeller in the folded state.

FIG. 23 is a perspective view of a propeller propelling system 703 in a second variation of the third embodiment, and is a view illustrating a propeller 705 in the spread state. FIG. 24 is a perspective view of the propeller propelling system 703 in the second variation of the third embodiment, and is a view illustrating the propeller 705 in the folded state.

As illustrated in FIG. 23, the propeller propelling system 703 includes a motor 704 and the propeller 705 by replacing the motor 504 and the propeller 505. The motor 704 is different from the motor 504 in that four internal threads (not illustrated) by which the joint 210 is joined to a mounting wall 704c of a rotor 704a are provided, and in the other portion, the motor 704 is similar to the motor 504.

The propeller 705 is different from the propeller 505 in that four blades 706A, 706B, 706C, and 706D are included, and in the other portion, the propeller 705 is similar to the propeller 505. Hereinafter, as a generic term of the blades 706A, 706B, 706C, and 707D, a blade 706 is used. Blades 706 have been rotatably provided in the operation position (FIG. 23) where thrust is generated at the time of rotation of the propeller 705, and the folded position (FIG. 24) with the joint 210 as a center. Each of the blades 706 is manufactured by performing injection molding similarly to the propeller 5.

By employing the blades 506, 606, or 706 described above, the number of blades 506, 606, or 706 can be changed by changing the mounting wall 504c, 604c, or 704c without changing the shape of the blades 506, 606, or 706.

4. Fourth Embodiment

[4-1. Configuration of Propeller Propelling System According to Fourth Embodiment]

Figure 25:
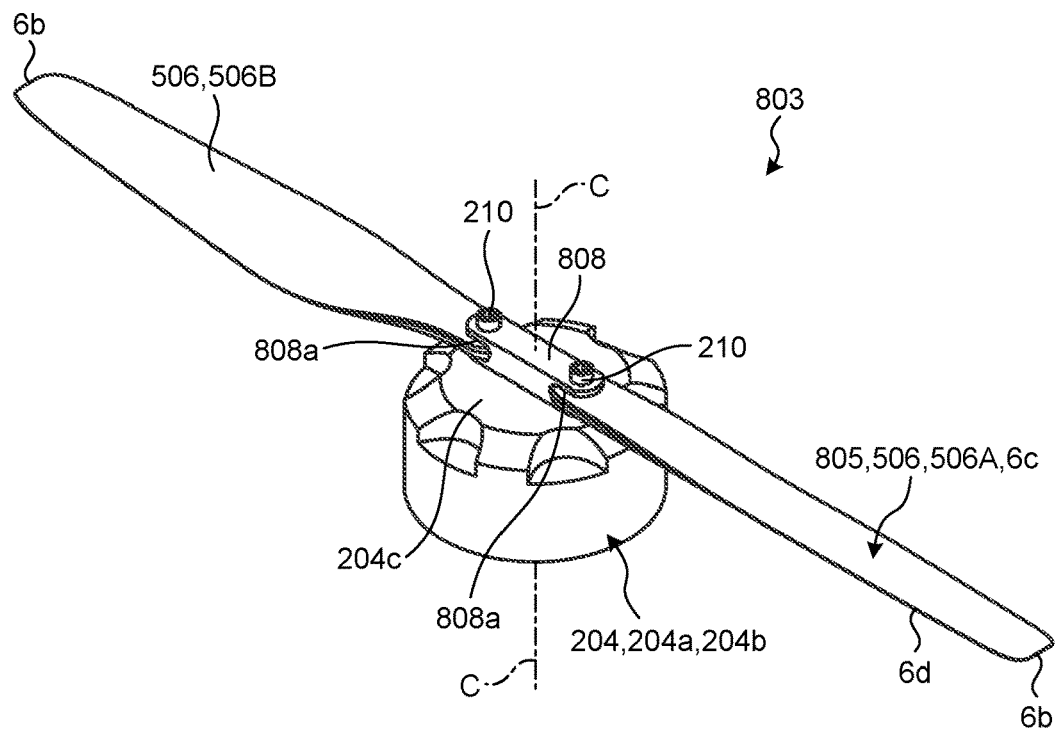
FIG. 25 is a perspective view of a propeller propelling system according to a fourth embodiment of the present disclosure, and is a view illustrating a propeller in the spread state.
Figure 26:
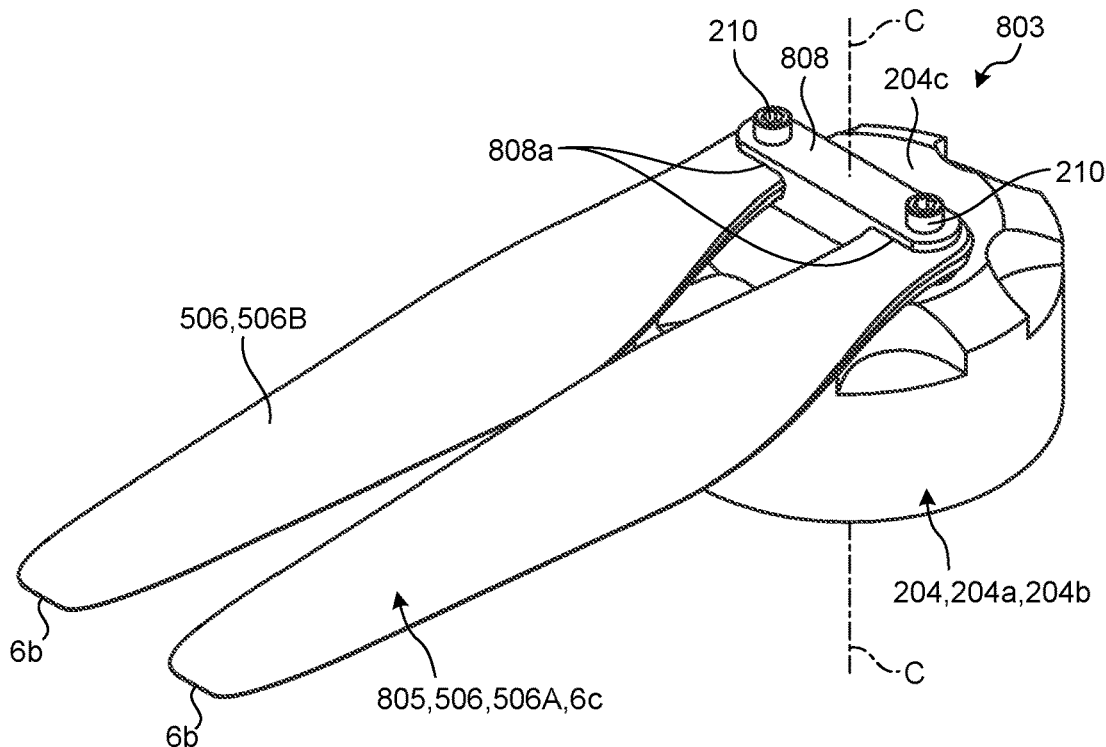
FIG. 26 is a perspective view of the propeller propelling system according to the fourth embodiment, and is a view illustrating the propeller in the folded state.

FIG. 25 is a perspective view of a propeller propelling system 803 according to a third embodiment of the present disclosure, and is a view illustrating a propeller 805 in the spread state. FIG. 26 is a perspective view of the propeller propelling system 803 according to the third embodiment, and is a view illustrating the propeller 805 in the folded state.

As illustrated in FIG. 25, the propeller propelling system 803 according to the present embodiment includes a motor 204 and the propeller 805 by replacing the motor 4 and the propeller 5. In addition, the propeller propelling system 803 includes a hub 808 that couples blades 506A and 506B of the propeller 805 to the motor 204. The hub 808 linearly extends in a direction that is orthogonal to the rotation central axis C, and supports blades 506 in both end parts. The hub 808 is included in the propeller 805. The hub 808 is an example of a coupling member.

The propeller 805 includes the two blades 506A and 506B that have been described in the third embodiment (FIG. 19). The blades 506 are joined to the motor 204 by a joint 210 with the hub 808 interposed therebetween in a state where a portion on a proximal end 6a is inserted into a recess 808a of the hub 808. The blades 506 have been rotatably provided in the operation position (FIG. 25) where thrust is generated at the time of rotation of the propeller 805, and the folded position (FIG. 26) with the joint 210 as a center.

[4-3. Effects]

As described above, in the present embodiment, the blades 6 have been rotatably provided in the operation position (FIG. 19) and the folded position (FIG. 25). Accordingly, the propeller 805 can be caused to enter into the folded state (FIG. 26).

[4-4. Variations]

Figure 27:
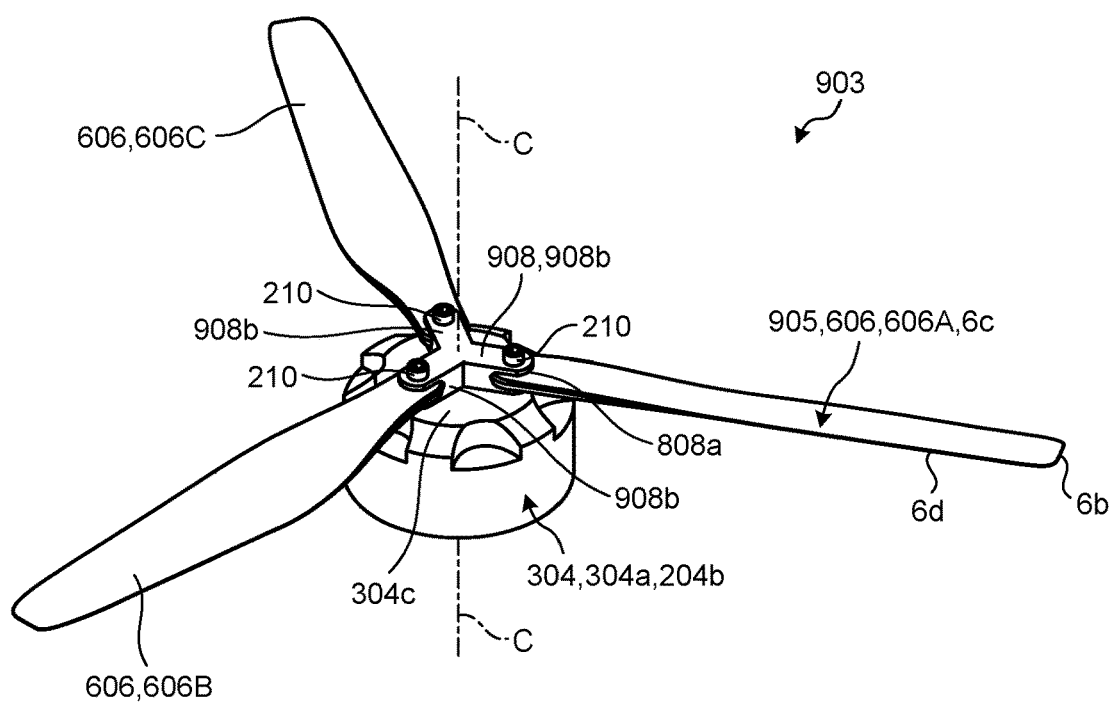
FIG. 27 is a perspective view of a propeller propelling system in a first variation of the fourth embodiment, and is a view illustrating a propeller in the spread state.
Figure 28:
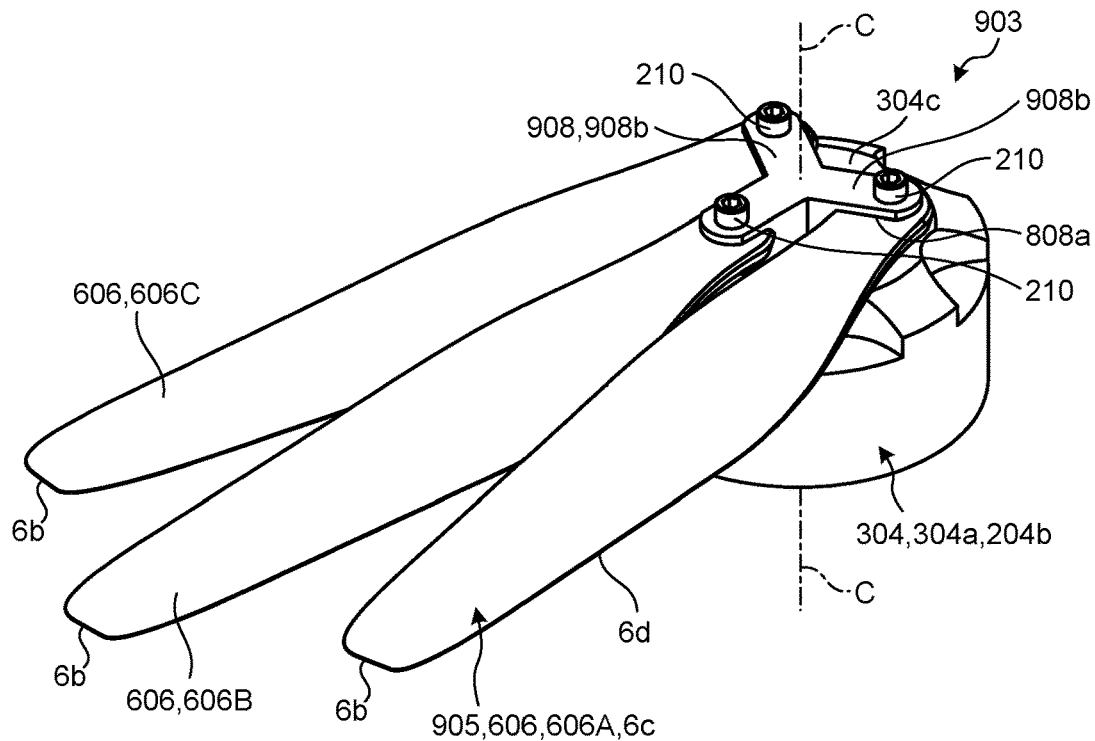
FIG. 28 is a perspective view of the propeller propelling system in the first variation of the fourth embodiment, and is a view illustrating the propeller in the folded state.

FIG. 27 is a perspective view of a propeller propelling system 903 in a first variation of the fourth embodiment of the present disclosure, and is a view illustrating a propeller 905 in the spread state. FIG. 28 is a perspective view of the propeller propelling system 903 in the first variation of the fourth embodiment, and is a view illustrating the propeller 905 in the folded state.

As illustrated in FIG. 27, the propeller propelling system 903 includes a motor 304 and the propeller 905 by replacing the motor 204 and the propeller 805.

The propeller 905 is different from the propeller 805 in that the three blades 606A, 606B, and 606C that have been described in the first variation (FIG. 21) of the third embodiment and a hub 908 are included, and in the other portion, the propeller 905 is similar to the propeller 805. The hub 908 includes three arms 908b that extend radially relative to the rotation central axis C, and supports the blades 606 in distal end parts of the respective arms 908b. The blades 606 have been rotatably provided in the operation position (FIG. 27) where thrust is generated at the time of rotation of the propeller 905, and the folded position (FIG. 28) with the joint 210 as a center.

Figure 29:
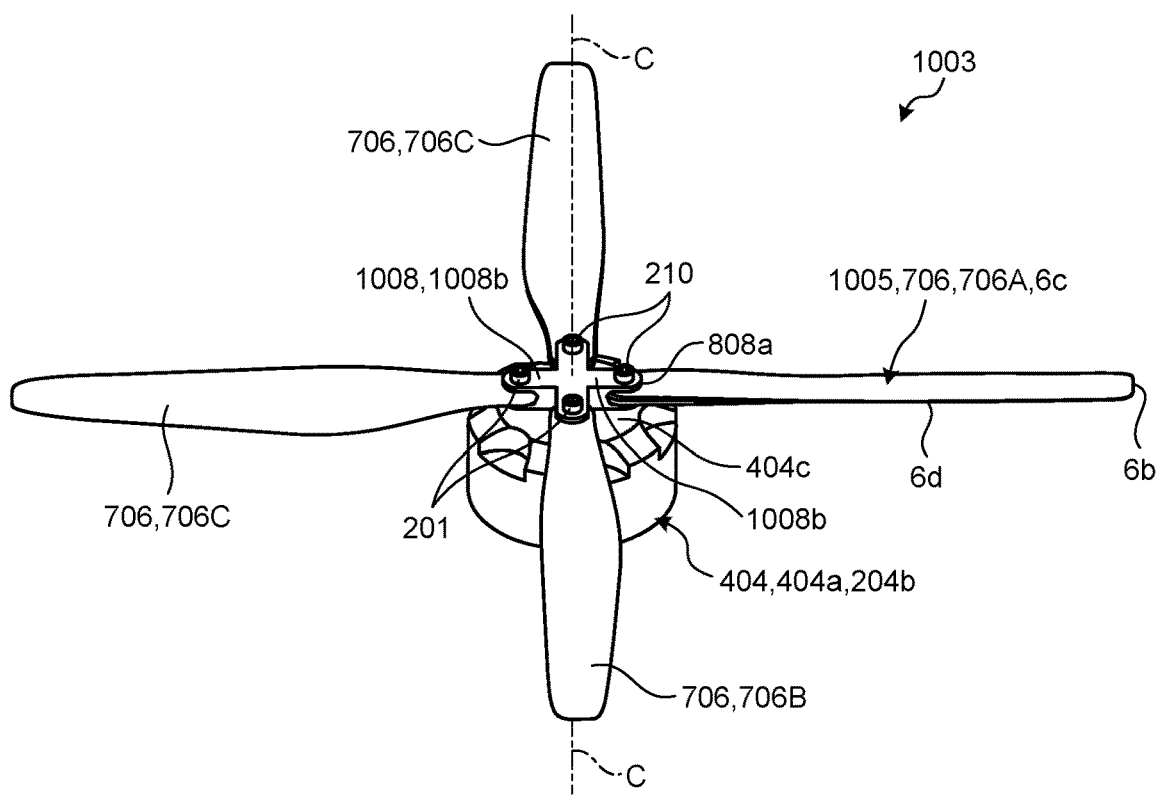
FIG. 29 is a perspective view of a propeller propelling system in a second variation of the fourth embodiment, and is a view illustrating a propeller in the spread state.
Figure 30:
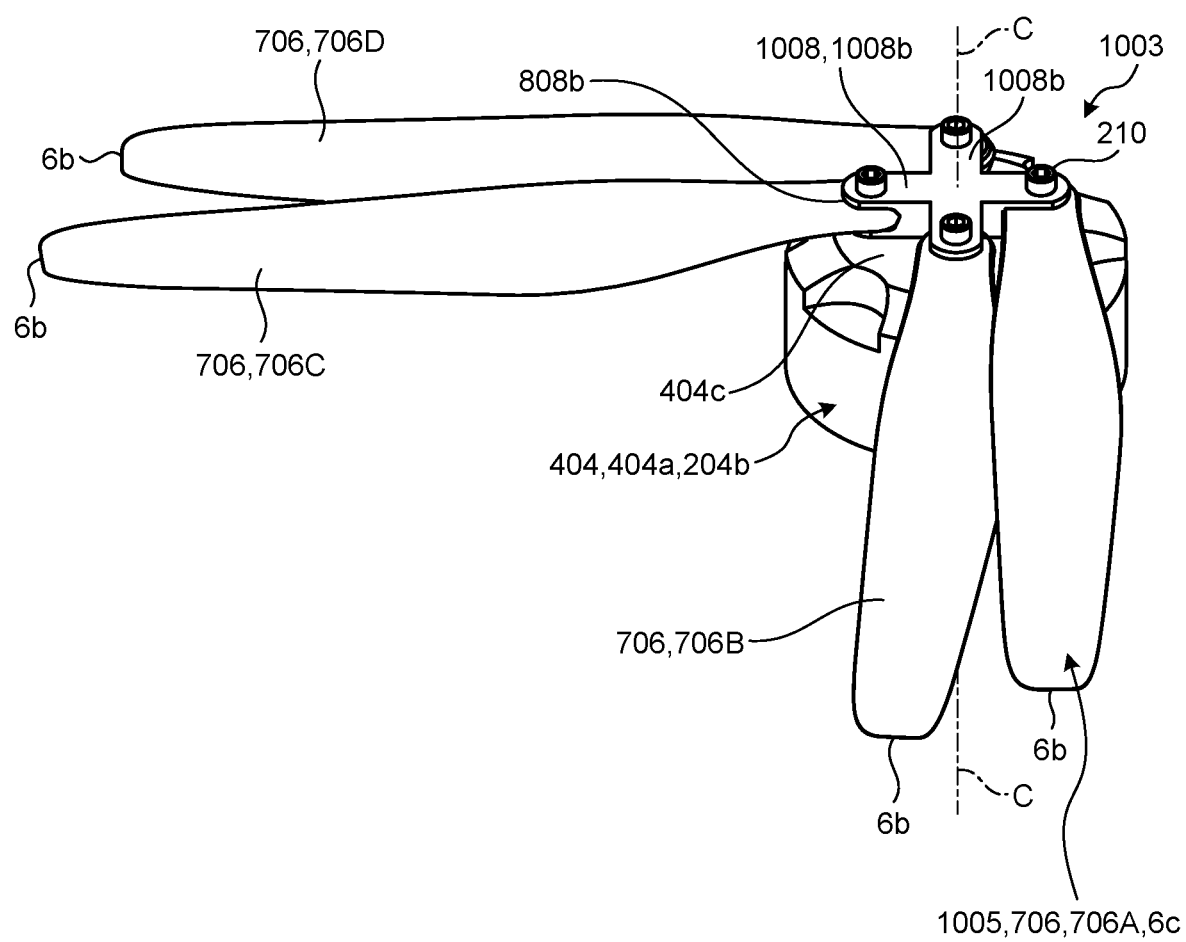
FIG. 30 is a perspective view of the propeller propelling system in the second variation of the fourth embodiment, and is a view illustrating the propeller in the folded state.

FIG. 29 is a perspective view of a propeller propelling system 1003 in a second variation of the fourth embodiment, and is a view illustrating a propeller 1005 in the spread state. FIG. 30 is a perspective view of the propeller propelling system 1003 in the second variation of the fourth embodiment, and is a view illustrating the propeller 1005 in the folded state.

As illustrated in FIG. 29, the propeller propelling system 1003 includes a motor 404 and the propeller 1005 by replacing the motor 804 and the propeller 805.

The propeller 1005 is different from the propeller 805 in that four blades 706A, 706B, 706C, and 706D and a hub 1008 are included, and in the other portion, the propeller 1005 is similar to the propeller 805. The hub 1008 includes four arms 1008b that extend radially relative to the rotation central axis C, and supports blades 706 in distal end parts of the respective arms 1008b. The blades 706 have been rotatably provided in the operation position (FIG. 29) where thrust is generated at the time of rotation of the propeller 1005, and the folded position (FIG. 30) with the joint 210 as a center.

Note that the effects described herein are only illustrative, and are not restrictive, and other effects may be exhibited.

Note that the present technology can also employ the configuration described below.

(1)

A propeller comprising:

a plurality of blades that extends outward in a radial direction of a rotation central axis relative to the (1)
rotation central axis, and includes an end that is located on an opposite side of the rotation central axis,
wherein each of the plurality of blades has a maximum angle of elevation in a position ranging from 30% to 60% with the rotation central axis as a starting point of a radius of a circle that passes through the end of each of the plurality of blades with the rotation central axis as a center, the maximum angle of elevation being a maximum of an angle of elevation in each of the plurality of blades,
a change in the angle of elevation in a longitudinal direction of each of the plurality of blades is within 10 degrees per 5% of the radius,
a change in the longitudinal direction of a cross-sectional maximum blade thickness is within 20% of a maximum blade thickness of each of the plurality of blades per 5% of the radius, the cross-sectional maximum blade thickness being a maximum blade thickness in a cross section of each of the plurality of blades, the cross section being orthogonal to the longitudinal direction, and
a change in a chord length of each of the plurality of blades in the longitudinal direction is within 20% of a maximum of the chord length in each of the plurality of blades per 5% of the radius.

(2)
The propeller according to (1), wherein
a number of the plurality of blades is any one of two to four, and
the plurality of blades is formed integrally with each other, and configures a single member.

(3)
The propeller according to (1), wherein
a number of the plurality of blades is any one of two to four, and
the plurality of blades is formed separately from each other, and is coupled to each other by using a coupling member.

(4)
The propeller according to any one of (1) to (3), wherein each of the plurality of blades has the maximum of the chord length in any one of a position within 10% on a side of the rotation central axis of the radius and a position within 10% on the opposite side of the rotation central axis of the radius, relative to a position of the maximum angle of elevation in each of the plurality of blades.

(5)
The propeller according to any one of (1) to (4), wherein each of the plurality of blades includes two faces that are located on sides opposite to each other in an axis direction of the rotation central axis, and
each of the two faces includes a flat region that is orthogonal to the axis direction of the rotation central axis, within 10% with the rotation central axis as the starting point of the radius.

(6)
The propeller according to any one of (1) to (5), wherein a material of the plurality of blades includes a thermoplastic resin.

(7)
The propeller according to (6), wherein the thermoplastic resin includes a carbon fiber-reinforced thermoplastic resin.

(8)
The propeller according to (6), wherein the thermoplastic resin includes a polyamide resin-based material.

(9)
A flying object comprising:
the propeller according to any one of (1) to (8); and
a driving source that drives the propeller.

(10)
A method for manufacturing a propeller, the method comprising:
an injection process for injecting a material in a melted state into a mold that is used to form a plurality of blades of the propeller; and
an extraction process for extracting the material that has been solidified from the mold,
wherein the propeller includes the plurality of blades that extends outward in a radial direction of a rotation central axis relative to the rotation central axis, and includes an end that is located on an opposite side of the rotation central axis, each of the plurality of blades has a maximum angle of elevation in a position ranging from 30% to 60% with the rotation central axis as a starting point of a radius of a circle that passes through the end of each of the plurality of blades with the rotation central axis as a center, the maximum angle of elevation being a maximum of an angle of elevation in each of the plurality of blades, a change in the angle of elevation in a longitudinal direction of each of the plurality of blades is within 10 degrees per 5% of the radius, a change in the longitudinal direction of a cross-sectional maximum blade thickness is within 20% of a maximum blade thickness of each of the plurality of blades per 5% of the radius, the cross-sectional maximum blade thickness being a maximum blade thickness in a cross section of each of the plurality of blades, the cross section being orthogonal to the longitudinal direction, and a change in a chord length of each of the plurality of blades in the longitudinal direction is within 20% of a maximum of the chord length in each of the plurality of blades per 5% of the radius.

(11)
The method for manufacturing the propeller according to (10), in which
a number of the plurality of blades is any one of two to four, and
the plurality of blades is formed integrally with each other, and configures a single member.

(12)
The method for manufacturing the propeller according to (10), in which
a number of the plurality of blades is any one of two to four, and
the plurality of blades is formed separately from each other, and is coupled to each other by using a coupling member.

(13)
The method for manufacturing the propeller according to any one of (10) to (12), in which each of the plurality of blades has the maximum of the chord length in any one of a position within 10% on a side of the rotation central axis of the radius and a position within 10% on the opposite side of the rotation central axis of the radius, relative to a position of the maximum angle of elevation in each of the plurality of blades.

(14)
The method for manufacturing the propeller according to any one of (10) to (13), in which
each of the plurality of blades includes two faces that are located on sides opposite to each other in an axis direction of the rotation central axis, and each of the two faces includes a flat region that is orthogonal to the axis direction of the rotation central axis, within 10% with the rotation central axis as the starting point of the radius.

(15)

The method for manufacturing the propeller according to any one of (10) to (14), in which the material of the plurality of blades includes a thermoplastic resin.

(16)

The method for manufacturing the propeller according to (15), in which the thermoplastic resin includes a carbon fiber-reinforced thermoplastic resin.

(17)

The method for manufacturing the propeller according to (15), in which the thermoplastic resin includes a polyamide resin-based material.

REFERENCE SIGNS LIST

1 FLYING OBJECT
4, 204, 304, 404, 504, 604, 704 MOTOR (DRIVING SOURCE)
5, 205, 305, 405, 505, 605, 705, 805, 905, 1005, PROPELLER
6, 206, 306, 406, 506, 606, 706 BLADE
6b DISTAL END (END)
808, 908, 1008 HUB (COUPLING MEMBER)
C ROTATION CENTRAL AXIS
L1 CHORD LENGTH
L2 CROSS-SECTIONAL MAXIMUM BLADE THICKNESS
S1 INJECTION PROCESS
S2 EXTRACTION PROCESS
α ANGLE OF ELEVATION

The invention claimed is:

1. A propeller comprising:
   a plurality of blades that extends outward in a radial direction of a rotation central axis relative to the rotation central axis, and includes an end that is located on an opposite side of the rotation central axis,
   wherein each of the plurality of blades has a maximum angle of elevation in a position ranging from 30% to 60% with the rotation central axis as a starting point of a radius of a circle that passes through the end of each of the plurality of blades with the rotation central axis as a center, the maximum angle of elevation being a maximum of an angle of elevation in each of the plurality of blades,
   a change in the angle of elevation in a longitudinal direction of each of the plurality of blades is within 10 degrees per 5% of the radius,
   a change in the longitudinal direction of a cross-sectional maximum blade thickness is within 20% of a maximum blade thickness of each of the plurality of blades per 5% of the radius, the cross-sectional maximum blade thickness being a maximum blade thickness in a cross section of each of the plurality of blades, the cross section being orthogonal to the longitudinal direction, and
   a change in a chord length of each of the plurality of blades in the longitudinal direction is within 20% of a maximum of the chord length in each of the plurality of blades per 5% of the radius.

2. The propeller according to claim 1, wherein
   a number of the plurality of blades is any one of two to four, and
   the plurality of blades is formed integrally with each other, and configures a single member.

3. The propeller according to claim 1, wherein
   a number of the plurality of blades is any one of two to four, and
   the plurality of blades is formed separately from each other, and is coupled to each other by using a coupling member.

4. The propeller according to claim 1, wherein each of the plurality of blades has the maximum of the chord length in any one of a position within 10% on a side of the rotation central axis of the radius and a position within 10% on the opposite side of the rotation central axis of the radius, relative to a position of the maximum angle of elevation in each of the plurality of blades.

5. The propeller according to claim 4, wherein
   a number of the plurality of blades is any one of two to four, and
   the plurality of blades is formed integrally with each other, and configures a single member.

6. The propeller according to claim 4, wherein
   a number of the plurality of blades is any one of two to four, and
   the plurality of blades is formed separately from each other, and is coupled to each other by using a coupling member.

7. The propeller according to claim 4, wherein
   each of the plurality of blades includes two faces that are located on sides opposite to each other in an axis direction of the rotation central axis, and
   each of the two faces includes a flat region that is orthogonal to the axis direction of the rotation central axis, within 10% with the rotation central axis as the starting point of the radius.

8. The propeller according to claim 7, wherein
   a number of the plurality of blades is any one of two to four, and
   the plurality of blades is formed integrally with each other, and configures a single member.

9. The propeller according to claim 7, wherein
   a number of the plurality of blades is any one of two to four, and
   the plurality of blades is formed separately from each other, and is coupled to each other by using a coupling member.

10. The propeller according to claim 1, wherein a material of the plurality of blades includes a thermoplastic resin.

11. The propeller according to claim 10, wherein the thermoplastic resin includes a carbon fiber-reinforced thermoplastic resin.

12. The propeller according to claim 10, wherein the thermoplastic resin includes a polyamide resin-based material.

13. A flying object comprising:
   the propeller according to claim 1; and
   a driving source that drives the propeller.

14. A method for manufacturing a propeller, the method comprising:
   an injection process for injecting a material in a melted state into a mold that is used to form a plurality of blades of the propeller; and
   an extraction process for extracting the material that has been solidified from the mold,
   wherein the propeller includes the plurality of blades that extends outward in a radial direction of a rotation central axis relative to the rotation central axis, and includes an end that is located on an opposite side of the rotation central axis, each of the plurality of blades has a maximum angle of elevation in a position ranging from 30% to 60% with the rotation central axis as a starting point of a radius of a circle that passes through the end of each of the plurality of blades with the rotation central axis as a center, the maximum angle of elevation being a maximum of an angle of elevation in each of the plurality of blades, a change in the angle of elevation in a longitudinal direction of each of the plurality of blades is within 10 degrees per 5% of the radius, a change in the longitudinal direction of a cross-sectional maximum blade thickness is within 20% of a maximum blade thickness of each of the plurality of blades per 5% of the radius, the cross-sectional maximum blade thickness being a maximum blade thickness in a cross section of each of the plurality of blades, the cross section being orthogonal to the longitudinal direction, and a change in a chord length of each of the plurality of blades in the longitudinal direction is within 20% of a maximum of the chord length in each of the plurality of blades per 5% of the radius.

* * * * *